US011019541B2

(12) United States Patent
Lee et al.

(10) Patent No.: US 11,019,541 B2
(45) Date of Patent: May 25, 2021

(54) ELECTRONIC DEVICE AND METHOD FOR ADAPTIVELY CHANGING INFORMATION REGARDING BAND COMBINATION

(71) Applicant: SAMSUNG ELECTRONICS CO., LTD., Suwon-si (KR)

(72) Inventors: Shinduck Lee, Suwon-si (KR); Hyunchul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/505,934

(22) Filed: Jul. 9, 2019

(65) Prior Publication Data
US 2020/0022036 A1 Jan. 16, 2020

(30) Foreign Application Priority Data
Jul. 12, 2018 (KR) .................. 10-2018-0081091

(51) Int. Cl.
*H04W 36/00* (2009.01)
*H04L 5/00* (2006.01)
(Continued)

(52) U.S. Cl.
CPC ....... *H04W 36/0069* (2018.08); *H04L 5/0032* (2013.01); *H04W 36/0072* (2013.01);
(Continued)

(58) Field of Classification Search
CPC ............. H04W 36/00; H04W 36/0055; H04W 5/0032; H04W 36/0072; H04W 36/22;
(Continued)

(56) References Cited

U.S. PATENT DOCUMENTS 9,338,695 B2 5/2016 Kitazoe et al.
10,805,823 B2 * 10/2020 Dhanapal .......... H04W 28/0215
(Continued)

FOREIGN PATENT DOCUMENTS

EP 3 120 487 7/2017
KR 10-2015-0128508 11/2015

OTHER PUBLICATIONS

3rd Generation Partnership Project; Technical Specification Group Core Network and Terminals; Non-Access-Stratum (NAS) protocol for Evolved Packet System (EPS); Stage 3 (Release 16), 3GPP TS 24.301, V16.1.1, Jun. 2019, 549 pages.
(Continued)

*Primary Examiner* — Khawar Iqbal
(74) *Attorney, Agent, or Firm* — Nixon & Vanderhye P.C.

(57) ABSTRACT

An electronic device is provided. The electronic device includes wireless communication circuitry, a processor operatively coupled to the wireless communication circuitry, and a memory operatively coupled to the processor. The memory stores instructions configure, based on execution, the processor to control the electronic device to: receive, from a base station, a first message related with user equipment (UE) capability enquiry, the first message including information indicating the number of carrier aggregation (CA) combinations related with a network associated with the base station using the wireless communication circuitry, identify UE capability information, based at least in part on the number of CA combinations related with the network and the number of CA combinations supportable in the electronic device, and transmit a second message including the identified UE capability information to the network using the wireless communication circuitry.

19 Claims, 8 Drawing Sheets

(51) Int. Cl.
*H04W 36/22* (2009.01)
*H04W 72/04* (2009.01)
*H04W 48/08* (2009.01)

(52) U.S. Cl.
CPC .......... *H04W 36/22* (2013.01); *H04W 48/08* (2013.01); *H04W 72/048* (2013.01); *H04W 72/0413* (2013.01)

(58) Field of Classification Search
CPC . H04W 48/08; H04W 36/0069; H04W 36/08; H04W 72/0413; H04W 72/0742; H04W 72/0453; H04W 88/06; H04W 72/048; H04W 72/00; H04W 28/18; H04W 24/10; H04W 48/16; H04L 5/0032; H04L 5/001
See application file for complete search history.

(56) References Cited

U.S. PATENT DOCUMENTS

| | | | | |
|---|---|---|---|---|
| 10,834,625 | B2* | 11/2020 | Vintola | H04L 5/0094 |
| 2010/0272051 | A1 | 10/2010 | Fu et al. | |
| 2014/0092825 | A1 | 4/2014 | Bostrom et al. | |
| 2015/0156695 | A1 | 6/2015 | Zhang et al. | |
| 2016/0262053 | A1* | 9/2016 | Palm | H04L 5/001 |
| 2017/0150410 | A1* | 5/2017 | Yang | H04W 36/04 |
| 2017/0367073 | A1* | 12/2017 | Murugan | H04B 1/0053 |
| 2018/0220295 | A1* | 8/2018 | Takahashi | H04W 72/0406 |
| 2018/0279309 | A1* | 9/2018 | Takahashi | H04J 11/00 |
| 2019/0082425 | A1* | 3/2019 | Li | H04W 56/0005 |
| 2019/0110254 | A1* | 4/2019 | Yerramalli | H04W 52/0251 |
| 2019/0239191 | A1* | 8/2019 | Zee | H04W 36/0016 |
| 2019/0253945 | A1* | 8/2019 | Paladugu | H04W 12/1006 |
| 2019/0268819 | A1* | 8/2019 | Kim | H04W 72/04 |
| 2019/0281488 | A1* | 9/2019 | Xiong | H04W 72/085 |
| 2019/0342890 | A1* | 11/2019 | Tong | H04W 8/24 |
| 2020/0280913 | A1* | 9/2020 | Chen | H04W 48/20 |
| 2020/0344633 | A1* | 10/2020 | Zhang | H04W 28/18 |
| 2020/0351834 | A1* | 11/2020 | Gholmieh | H04W 72/04 |
| 2020/0359310 | A1* | 11/2020 | Ingale | H04W 48/16 |
| 2020/0367215 | A1* | 11/2020 | Futaki | H04L 5/0091 |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331, V15.2.1, Apr. 2019, 948 pages.

3rd Generation Partnership Project; Technical Specification Group Radio Access Network; General Packet Radio Service (GPRS); Mobile Station (MS)—Base Station System (BSS) interface; Radio Link Control / Medium Access Control (RLC/MAC) protocol (Release 15), 3GPP TS 44.060, V15.0.0, Jun. 2018, 778 pages.

3rd Generation Partnership Project; Technical Specification Group Radio Access Network; Evolved Universal Terrestrial Radio Access (E-UTRA) and Evolved Packet Core (EPC); Common test environments for User Equipment (UE) conformance testing (Release 16), 3GPP TS 36.508, V16.0.0, Mar. 2019, 645 pages.

3rd Generation Partnership Project; Technical Specification Group Radio Access Network; Radio Resource Control (RRC); Protocol specification (Release 15), 3GPP TS 25.331, V15.4.0, Sep. 2019, 2318 pages.

Search Report and Written Opinion dated Oct. 17, 2019 in counterpart International Patent Application No. PCT/KR2019/008308.

* cited by examiner

ELECTRONIC DEVICE AND METHOD FOR ADAPTIVELY CHANGING INFORMATION REGARDING BAND COMBINATION

CROSS-REFERENCE TO RELATED APPLICATION

This application is based on and claims priority under 35 U.S.C. § 119 to Korean Patent Application No. 10-2018-0081091, filed on Jul. 12, 2018, in the Korean Intellectual Property Office, the disclosure of which is incorporated by reference herein in its entirety.

BACKGROUND

Field

The disclosure relates to an electronic device for adaptively changing information about a band combination transmitted to a network in a wireless environment, and an operation method thereof.

DESCRIPTION OF RELATED ART

Electronic devices capable of performing cellular communication, such as smartphones, tablet personal computers (PCs), smart watches, etc. are under development. To provide a higher data transmission rate in the cellular communication, these electronic devices can use carrier aggregation (CA). For use of CA, the electronic devices can provide information about a band combination to a network through a base station.

The electronic device can provide information about a band combination configured with bands available in the electronic device for carrier aggregation (CA), to the network. Because the network receives the information about the band combination from a plurality of electronic devices such as the electronic device, a solution for reducing a size of the information about the band combination can be demanded in aspects of network load management.

The above information is presented as background information only to assist with an understanding of the present disclosure. No determination has been made, and no assertion is made, as to whether any of the above might be applicable as prior art with regard to the present disclosure.

SUMMARY

According to various example embodiments of the present disclosure an electronic device and method are provided to address at least the foregoing shortcomings by providing an electronic device and method providing a band combination having a reduced size, thereby providing higher resource efficiency.

An electronic device according to various example embodiments may include wireless communication circuitry, a processor operatively coupled to the wireless communication circuitry, and a memory operatively coupled to the processor. The memory may store instructions which, based on execution, cause the processor to control the electronic device to: receive, from a base station, a first message related to a user equipment (UE) capability enquiry, the first message including information indicating a number of carrier aggregation (CA) combinations related with a network associated with the base station using the wireless communication circuitry, identify UE capability information, based at least in part on the number of CA combinations related with the network and the number of CA combinations supportable in the electronic device, and transmit a second message including the identified UE capability information to the network using the wireless communication circuitry.

An electronic device according to various example embodiments may include at least one memory storing instructions, communication circuitry, and at least one processor operatively coupled to the at least one memory and the communication circuitry. The at least one processor may be configured, based on executing the instructions, to control the electronic device to: receive information indicating a plurality of bands supportable in a network from a base station, identify bands which are available in the electronic device for carrier aggregation (CA) from among the plurality of bands, and transmit information about a band combination configured with the identified bands to the base station.

An electronic device according to various example embodiments may include at least one memory storing instructions, communication circuitry, and at least one processor operatively coupled to the at least one memory and the communication circuitry. The at least one processor may be configured, based on executing the instructions, to control the electronic device to: transmit information indicating a band combination configured with first bands which are available in the electronic device for carrier aggregation (CA) to a first base station in a state of the electronic device being coupled to a network through the first base station, and perform cell re-selection with a second base station distinct from the first base station after transmitting the information, and transmit information indicating a band combination configured with second bands which are available in the electronic device for CA and are at least partially different from the first bands to the second base station in a state of the electronic device being coupled to the network through the second base station after performing the cell re-selection.

A base station according to various example embodiments may include at least one memory including instructions, communication circuitry, and at least one processor operatively coupled to the at least one memory and the communication circuitry. The at least one processor may be configured, based on executing the instructions, to control the base station to: transmit information indicating a plurality of bands supportable in a network to an external electronic device, and receive information from an external electronic device about a band combination configured with bands which are available in the external electronic device for carrier aggregation (CA) and are identified by the external electronic device from among the plurality of bands.

A method of operating an electronic device according to various example embodiments may include receiving, from a base station, a first message related to a user equipment (UE) capability enquiry, the first message including information indicating a number of carrier aggregation (CA) combinations related with a network associated with the base station, identifying UE capability information based at least in part on the number of CA combinations related with the network and the number of CA combinations supportable in the electronic device, and transmitting a second message including the identified UE capability information, to the network.

A method of operating an electronic device according to various example embodiments may include receiving information indicating a plurality of bands supportable in a network from a base station, identifying bands which are available in the electronic device for carrier aggregation (CA) from among the plurality of bands, and transmitting information about a band combination configured with the identified bands to the base station.

A method of operating an electronic device according to various example embodiments may include transmitting information indicating a band combination configured with first bands which are available in the electronic device for carrier aggregation (CA) to a first base station in a state of the electronic device being coupled to a network through the first base station, performing cell re-selection with a second base station distinct from the first base station after transmitting the information, and transmitting information indicating a band combination configured with second bands which are available in the electronic device for CA and are at least partially different from the first bands to the second base station in a state of the electronic device being coupled to the network through the second base station after performing the cell re-selection.

A method for operating a base station according to various example embodiments may include transmitting information indicating a plurality of bands supportable in a network to an external electronic device, and receiving information about a band combination configured with bands which are available in the external electronic device for carrier aggregation (CA) and are identified by the external electronic device from among the plurality of bands from the external electronic device.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
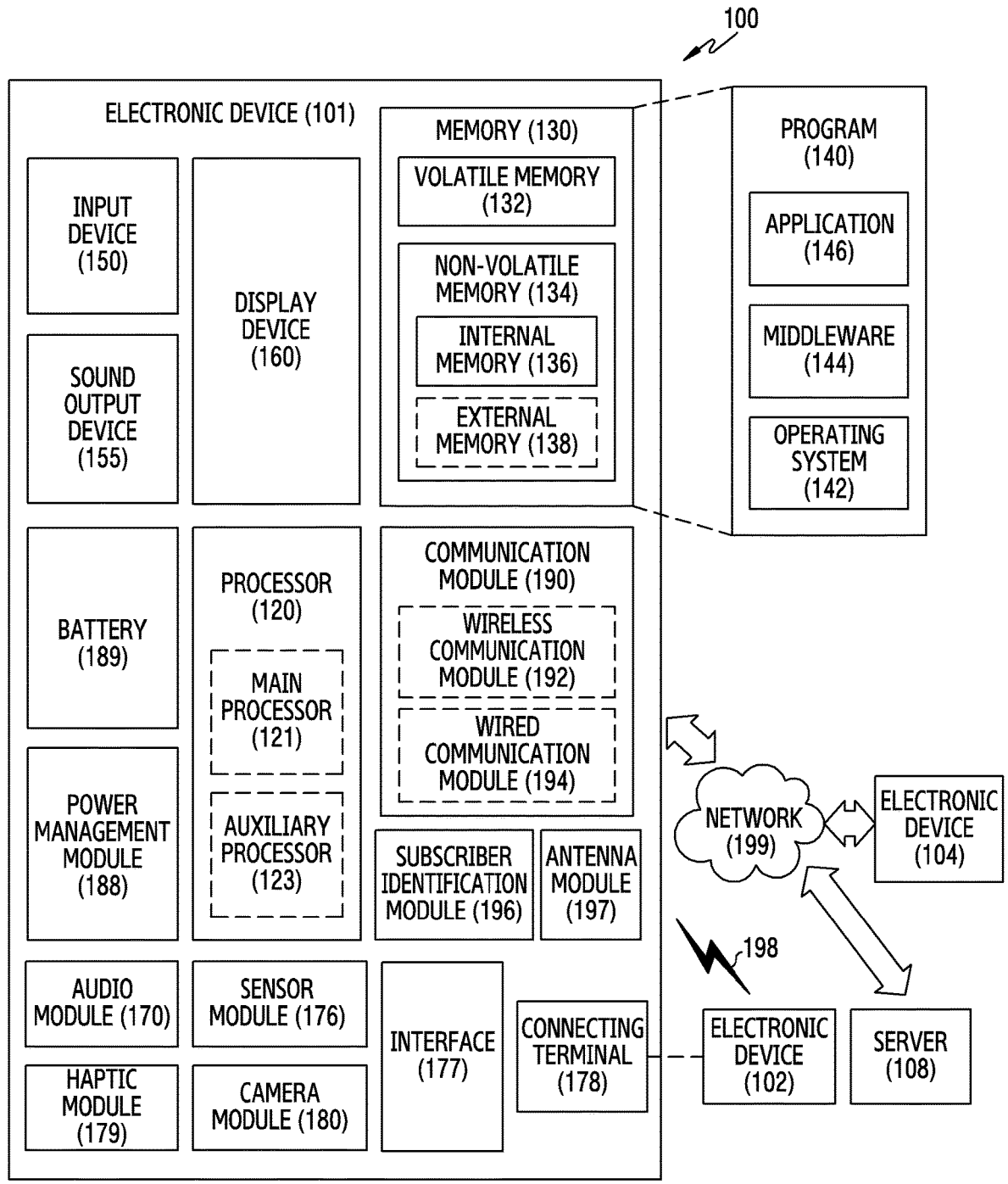
FIG. 1 is a block diagram illustrating an example electronic device within a network environment according to various embodiments.

FIG. 1 is a block diagram illustrating an electronic device 101 in a network environment 100, adaptively changing information about a band combination, according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to various embodiments disclosed herein may be various types of devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with,", the element may be coupled with the other element directly (e.g., wiredly), wirelessly, or via a third element.

As used herein, the term "module" may include a unit implemented in hardware, software, firmware, or any combinations thereof and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the invoked at least one instruction. The one or more instructions may include a code generated by a complier or a code executable by an interpreter. The machine-readable storage media may be provided in the form of non-transitory storage media. Wherein, the term "non-transitory" may refer, for example, to a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more components of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
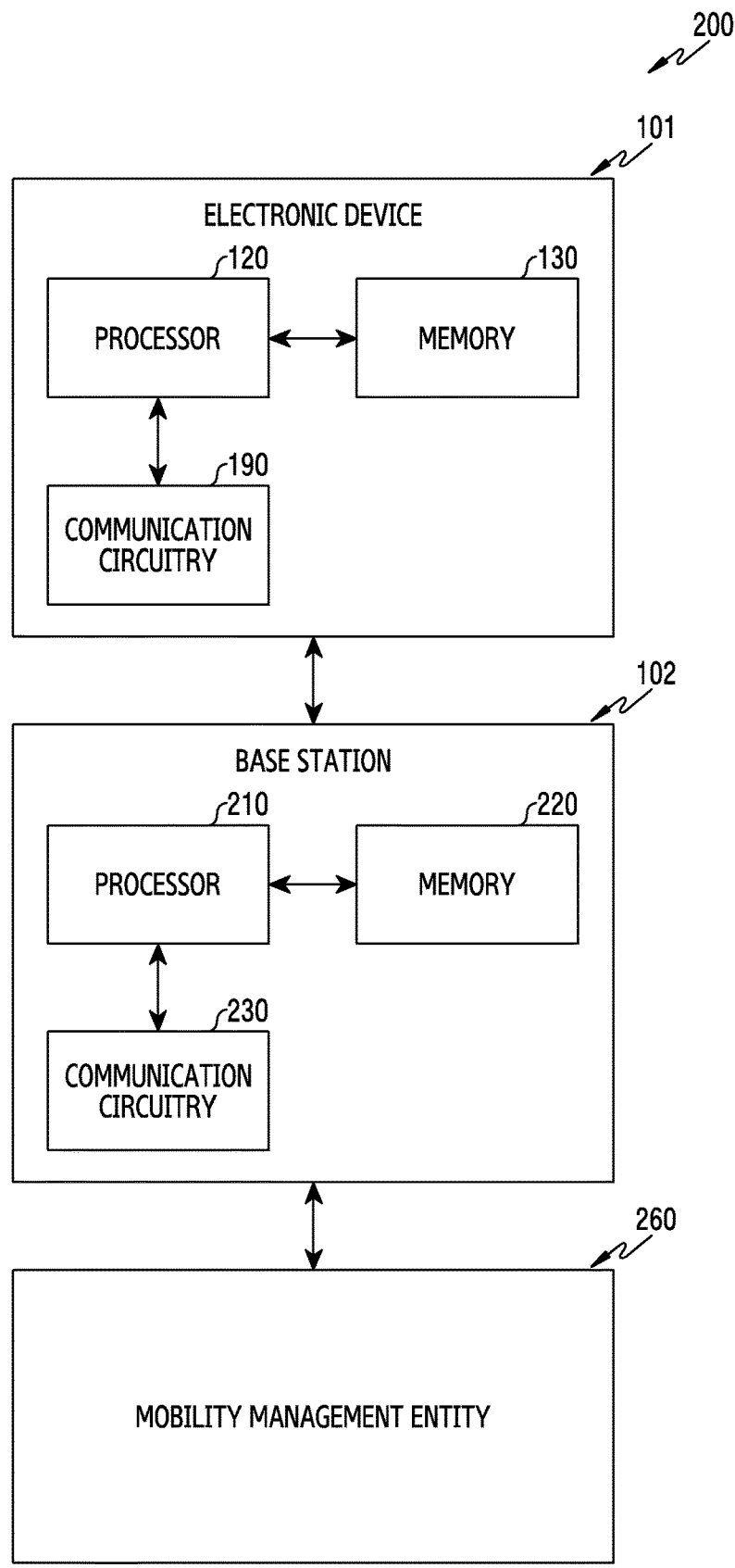
FIG. 2 is a diagram illustrating an example of a wireless environment of an electronic device according to various embodiments.

FIG. 2 is a diagram illustrating an example of a wireless environment of an electronic device according to various embodiments. This wireless environment may include the electronic device 101 and the electronic device 102 that are shown in FIG. 1.

Referring to FIG. 2, the wireless environment 200 may include the electronic device 101, a base station 102 (e.g., the electronic device 102), and a mobility management entity (MME) (e.g., including various processing circuitry, memory and/or executable program elements) 260.

In various embodiments, the electronic device 101 may be a device receiving a cellular communication service from the base station 102. For example, the electronic device 101 may, without limitation, be a mobile phone, a smartphone, a music player, a portable game console, a navigation system, a laptop computer, etc. receiving the cellular communication service. In accordance with a communication standard or a radio access technology (RAT), the electronic device 101 may be referred, for example, to as a user equipment (UE), a terminal, a mobile station, a station (STA), etc.

In various embodiments, the electronic device 101 may include a processor (e.g., including processing circuitry) 120, a memory 130, and a communication circuitry 190. In various embodiments, the processor 120 may include the processor 120 shown in FIG. 1, and the memory 130 may include the memory 130 shown in FIG. 1, and the communication circuitry 190 may include the communication module 190 or wireless communication module 192 shown in FIG. 1.

In various embodiments, the processor 120 may include various processing circuitry and generate, obtain, process and/or configure information, data, a message, and/or a signal that will be transmitted using cellular communication. In various embodiments, by controlling the communication circuitry 190, the processor 120 may transmit the generated or obtained or processed or configured information, data, message, or signal to another electronic device (e.g., the base station 102) through the cellular communication. In various embodiments, the information, data, message, or signal transmitted to the another electronic device (e.g., the base station 102) may include at least one of control information or user data.

In various embodiments, by controlling the communication circuitry 190, the processor 120 may receive information, data, a message, and/or a signal from the another electronic device (e.g., the base station 102) through the cellular communication. In various embodiments, the processor 120 may process the information, data, message and/or signal received from the another electronic device (e.g., the base station 102). In various embodiments, the information, data, message, or signal received from the another electronic device (e.g., the base station 102) may include at least one of control information or user data.

In various embodiments, the processor 120 may perform the above-described operations, based on execution of at least one of instructions, codes, software, and/or commands stored in the memory 130.

In various embodiments, the memory 130 may store a control instruction code for controlling the electronic device 101, control data (e.g., instructions, software, commands, etc.), and/or user data. For example, the memory 130 may store at least one of an application, an operating system (OS), middleware, or a device driver.

In various embodiments, the memory 130 may be operatively or operably coupled to the processor 120.

In various embodiments, the communication circuitry 190 may perform functions for transmitting and/or receiving information, a signal, data, and/or a message using cellular communication through a wireless channel.

In various embodiments, the communication circuitry 190 may perform a function of conversion between a baseband signal and a bit stream in compliance with the physical layer standard of a system. For example, when transmitting data, the communication circuitry 190 may encode and modulate a transmission bit stream, thereby generating complex symbols. For another example, when receiving data, the communication circuitry 190 may demodulate and decode a baseband signal, thereby restoring the baseband signal to a reception bit stream.

The communication circuitry 190 may up convert a baseband signal into a radio frequency (RF) band signal, and transmit the RF band signal through an antenna (not shown). In various embodiments, the antenna may be set suitable to a multiple-input-multiple-output (MIMO) scheme and/or a beam based communication scheme. The communication circuitry 190 may down convert an RF band signal received through the antenna, into a baseband signal. For example, the communication circuitry 190 may include, for example, and without limitation, a transmission filter, a reception filter, an amplifier, a mixer, an oscillator, a digital analog converter (DAC), an analog digital converter (ADC), etc.

In various embodiments, the communication circuitry 190 may be operatively coupled to the processor 120.

In various embodiments, the processor 120 may receive, from the base station 102, information indicating a plurality of bands supportable in a network. In various embodiments, the plurality of bands may include a band supported by the base station 102. In various embodiments, the plurality of bands may include a band supported by a neighboring cell of the base station 102. In various embodiments, the information indicating the plurality of bands may be included in a system information message transmitted and/or broadcast from the base station 102. For example, the system information message may include information related with inter-frequency cell re-selection. For example, in response to the electronic device 101 performing cellular communication using the long-term evolution (LTE) standard, the information for indicating the plurality of bands may, for example, be included in a system information block type 5 (SIB5) information element. However, the disclosure is not limited to this.

In various embodiments, the processor 120 may identify and/or extract bands available for carrier aggregation (CA) in the electronic device 101, among the supportable plurality of bands indicated by the information. In various embodiments, the processor 120 may identify the bands to configure information about a band combination to be transmitted from the electronic device 101 to the base station 102. Unlike a device of configuring a band combination using all bands available by itself for CA and transmitting information about the configured band combination, the electronic device 101 may configure information about a band combination having a reduced size, through the identifying by the processor 120.

In various embodiments, the processor 120 may receive a message for enquiring a capability of the electronic device 101 related with cellular communication, from the base station 102. In various embodiments, the message for enquiring the capability of the electronic device 101 related with the cellular communication may be used for requesting to transmit a band combination available in the electronic device 101 for CA. In various embodiments, the message for enquiring the capability of the electronic device 101 related with the cellular communication may be transmitted from the base station 102 to the electronic device 101 through a control channel. For example, in response to the electronic device 101 performing the cellular communication using the LTE standard, the message for enquiring the capability of the electronic device 101 related with the cellular communication may correspond to a UE capability enquiry message. However, the disclosure is not limited to this.

In various embodiments, the processor 120 may transmit, to the base station 102, information about a band combination configured with the identified bands. In various embodiments, the processor 120 may transmit, to the base station 102, the information about the band combination configured with the identified bands, as a response to the message for enquiring the capability of the electronic device 101 related with the cellular communication received from the base station 102. In various embodiments, the information about the band combination configured with the identified bands may be included in a message for providing the base station 102 with information about the capability of the electronic device 101 related with the cellular communication. In various embodiments, the message for providing the information about the capability may be transmitted from the electronic device 101 to the base station 102 through the control channel. For example, in response to the electronic device 101 performing the cellular communication using the LTE standard, the message for providing the information about the capability may correspond to a UE capability information message. However, the disclosure is not limited to this.

A size of the information about the band combination transmitted from the electronic device 101 and configured with the identified bands may be less than a size of information about a band combination transmitted from a device of configuring a band combination with all bands available by itself independently from (or regardless of) a supportable plurality of bands. By transmitting a band combination having information of a smaller size than the information about the band combination transmitted from the device of configuring the band combination with all the bands available by itself, the electronic device 101 may provide a higher resource efficiency. For example, by transmitting the band combination having the information of the smaller size than the information about the band combination transmitted from the device of configuring the band combination with all the bands available by itself, the electronic device 101 may secure a storage capacity of a network (e.g., the mobility management entity 260) storing the information about the band combination. For another example, by transmitting the band combination having the information of the smaller size than the information about the band combination transmitted from the device of configuring the band combination with all the bands available by itself, the electronic device 101 may shorten a time required for transmitting the information about the band combination or prevent the information about the band combination from non-forwarded to the network. However, the disclosure is not limited to this.

In various embodiments, the processor 120 may receive information indicating a plurality of frequencies of an RAT supported by the base station 102, from another base station (distinct from the base station 102) supporting another RAT not supporting CA. For example, in response to the electronic device 101 connecting to a 2G service, the processor 120 may receive the information indicating the plurality of frequencies of the RAT supported by the base station 102, from the another base station, through si2 quarter. For another example, in response to the electronic device 101 connecting to a 3G service, the processor 120 may receive the information for indicating the plurality of frequencies of the RAT supported by the base station 102, from the another base station, through a system information block type 19 (SIB 19). However, the disclosure is not limited to this.

In various embodiments, the processor 120 may identify bands, which are available in the electronic device 101 for CA, from among the plurality of frequencies received from the another base station supporting the another RAT. In various embodiments, the processor 120 may obtain a band combination configured with the bands identified from among the plurality of frequencies. In various embodiments, in response to the electronic device 101 doing handover from the another base station supporting the another RAT to the base station 102, the processor 120 may notify a band combination available in the electronic device 101 for CA, to a network, by transmitting information about the obtained band combination.

In various embodiments, the base station 102 may, for example, be a base station for cellular communication. In various embodiments, the base station 102 may perform communication with the electronic device 101 using the cellular communication. For example, the base station 102 may transmit information, a signal, data, and/or a message to the electronic device 101 using the cellular communication. For another example, the base station 102 may receive information, a signal, data, and/or a message from the electronic device 101 using the cellular communication. In accordance with a communication standard or an RAT, the base station 102 may refer, for example, to an evolved node B (eNB), etc.

In various embodiments, the base station 102 may include a processor 210 (e.g., a control unit or a control device including processing circuitry), a memory 220 (e.g., a storage unit or a storage device), and communication circuitry 230 (e.g., a communication unit or a communication device). In various embodiments, the processor 210 may include the processor 120, and the memory 220 may include the memory 130, and the communication circuitry 230 may include at least one of the communication circuitry 190, the communication module 190, or the wireless communication module 192.

In various embodiments, the processor 210 may include various processing circuitry and control the base station 102 to transmit information indicating a plurality of bands supportable in a network and/or information indicating a plurality of frequencies supportable in the network. In various embodiments, at least one of the plurality of bands and/or the plurality of frequencies may be related with an RAT supported by the base station 102, and/or be related with another RAT distinct from the RAT supported by the base station 102. In various embodiments, the information may be included in a system information message. For example, in response to the base station 102 performing cellular communication using the LTE standard, the information may be included in a system information block type 5 (SIB5) information element. For another example, in response to the base station 102 performing the cellular communication using the 2G standard, the information may be included in a si2 quarter. For further example, in response to the base station 102 performing the cellular communication using the 3G standard, the information may be included in a system information block type 19 (SIB 19). However, the disclosure is not limited to this.

In various embodiments, the processor 210 may transmit a message for enquiring a capability of the electronic device 101 related with cellular communication, to the electronic device 101. In various embodiments, the message for enquiring the capability of the electronic device 101 related with the cellular communication may be used for requesting to transmit a band combination which is available in the electronic device 101 for CA. In various embodiments, the message for enquiring the capability of the electronic device 101 related with the cellular communication may be transmitted from the base station 102 to the electronic device 101 through a control channel. For example, in response to the base station 102 performing the cellular communication using the LTE standard, the message may correspond to a UE capability enquiry message. However, the disclosure is not limited to this.

In various embodiments, the processor 210 may receive information about a band combination from the electronic device 101. In various embodiments, bands configuring the band combination may be identified by the electronic device 101 among the plurality of bands (or the plurality of frequencies) indicated by information transmitted from the base station 102. In various embodiments, the information about the band combination may be received from the electronic device 101, as a response to the message for enquiring the capability of the electronic device 101 related with the cellular communication transmitted from the base station 102. The information about the band combination received from the electronic device 101 may have a smaller size than information about a band combination received from a device of configuring the band combination with all bands available by itself. This is because the electronic device 101 obtains and transmits the information about the band combination in dependence on the plurality of bands (or the plurality of frequencies) indicated by the information transmitted from the base station 102, whereas the device obtains and transmits information about a band combination independently from (or regardless of) the plurality of bands.

In various embodiments, to provide CA to the electronic device 101, the processor 210 may provide the information about the band combination received from the electronic device 101, to the mobility management entity 260. In various embodiments, to provide CA to the electronic device 101, the mobility management entity 260 may store the information about the band combination.

As described above, by obtaining and transmitting information about a band combination available for CA using information about a plurality of bands (or a plurality of frequencies) received from the base station 102, the electronic device 101 of various embodiments may reduce a load of a network. By obtaining and transmitting the information about the band combination available for CA using the information about the plurality of bands received from the base station 102, the electronic device 101 of various embodiments may enhance a resource efficiency of cellular communication. For example, the electronic device 101 may obtain and transmit the information about the band combination using the plurality of bands, wherein the mobility management entity 260 may efficiently store the information about the band combination. For another example, by obtaining and transmitting the information about the band combination using the plurality of bands, the electronic device 101 may shorten a time required for transmitting the information about the band combination and/or prevent and/or reduce or avoid the information about the band combination from being non-forwarded to the network.

An electronic device (e.g., the electronic device 101) of various embodiments described above may include at least one memory (e.g., the memory 130) storing instructions, communication circuitry (e.g., the communication circuitry 190), and at least one processor (e.g., the processor 120) operatively coupled to the at least one memory and the communication circuitry. The at least one processor may be configured, based on executing the instructions, to control the electronic device to: receive information indicating a plurality of bands supportable in a network, from a base station, identify bands which are available in the electronic device for carrier aggregation (CA) from among the plurality of bands, and transmit information about a band combination configured with the identified bands to the base station.

In various embodiments, the at least one processor is configured, when executing the instructions, to control the electronic device to: receive a message requesting to transmit a band combination available for CA from the base station, and transmit the information about the band combination configured with the identified bands to the base station based on the receiving of the message. For example, the message received from the base station may correspond to a user equipment (UE) capability enquiry message, and the information about the band combination configured with the identified bands may be included in a UE capability information message.

In various embodiments, the information indicating the plurality of bands may be included in a system information message transmitted from the base station. For example, the system information message may include information related with inter-frequency cell re-selection.

In various embodiments, the information about the band combination configured with the identified bands transmitted from the electronic device may be stored in a mobility management entity (MME) through the base station.

In various embodiments, the at least one processor may be further configured, when executing the instructions, to control the electronic device to: perform cell re-selection after transmitting the information about the band combination configured with the identified bands, receive another information indicating a plurality of bands supportable in the network after the performing the cell re-selection, and transmit a message indicating the maintaining of the information about the band combination configured with the identified bands based on identifying that all of the plurality of bands indicated by the another information received after the performing of the cell re-selection correspond to all of the plurality of bands indicated by the information received before the performing of the cell re-selection.

For example, the at least one processor may be further configured, when executing the instructions, to control the electronic device to: transmit a message indicating the changing of the information about the band combination configured with the identified bands transmitted before the performing of the cell re-selection based on identifying that at least some of the plurality of bands indicated by the another information received after the performing of the cell re-selection are different from at least some of the plurality of bands indicated by the information received before the performing of the cell re-selection. For example, the at least one processor may be further configured, when executing the instructions, to control the electronic device to: identify other bands which are available in the electronic device for carrier aggregation (CA) from among the plurality of bands indicated by the another information received after the performing of the cell re-selection based on transmitting the message indicating the changing of the information about the band combination configured with the identified bands transmitted before the performing of the cell re-selection, and transmit information about another band combination configured with the identified other bands.

In various embodiments, the at least one processor may be further configured, when executing the instructions, to control the electronic device to: receive information for indicating a plurality of frequencies of a radio access technology (RAT) supportable in the network from another base station supporting another RAT distinct from the RAT supported by the base station, identify bands which are available in the electronic device for CA from among the plurality of frequencies, and obtain a band combination configured with the bands identified among the plurality of frequencies.

An electronic device of various embodiments described above may include wireless communication circuitry, a processor operatively coupled to the wireless communication circuitry, and a memory operatively coupled to the processor. The memory may store instructions that, when executed, cause the processor to control the electronic device to: receive, from a base station, a first message related with user equipment (UE) capability enquiry including information indicating the number of carrier aggregation (CA) combinations related with a network associated with the base station using the wireless communication circuitry, identify UE capability information based at least in part on the number of CA combinations related with the network and the number of CA combinations supportable in the electronic device, and transmit a second message including the identified UE capability information to the network using the wireless communication circuitry.

In various embodiments, the instructions may, when executed, cause the processor to control the electronic device to: receive a system information block (SIB) from the base station, wherein the SIB may include information related with the number of CA combinations associated with the network.

In various embodiments, the number of CA combinations associated with the network may include at least one of the number of CA combinations supported by a cell of the base station or the number of CA combinations supported by a neighboring cell of the base station.

In various embodiments, the instructions may, when executed, cause the processor to control the electronic device to: receive changed network information different from the network information using the wireless communication circuitry, re-identify UE capability information based at least in part on the number of CA combinations associated with the changed network and the number of CA combinations supportable in the electronic device, and transmit a second message including the re-identified UE capability information to the network using the wireless communication circuitry.

In various embodiments, the wireless communication circuitry may be configured to be connectable to a 4-Generation (4G) network and a 5-Generation (5G) network.

In various embodiments, the UE capability information included in the second message may include data for indicating the number of CA combinations to be used in the electronic device, identified based at least in part on the number of CA combinations related with the network and the number of CA combinations supported by the electronic device.

An electronic device of various embodiments described above may include at least one memory storing instructions, communication circuitry, and at least one processor operatively coupled to the at least one memory and the communication circuitry. The at least one processor may be configured, when executing the instructions, to control the electronic device to: transmit information indicating a band combination configured with first bands which are available in the electronic device for carrier aggregation (CA) to a first base station, in a state of the electronic device being coupled to a network through the first base station, perform cell re-selection with a second base station distinct from the first base station after transmitting the information, and transmit information indicating a band combination configured with second bands, which are available in the electronic device for CA and are at least partially different from the first bands, to the second base station, in a state of the electronic device being coupled to the network through the second base station after performing the cell re-selection.

In various embodiments, a size of the information for indicating the band combination configured with the first bands may be different from a size of the information for indicating the band combination configured with the second bands.

In various embodiments, bands supportable in the first base station may be at least partially different from bands supportable in the second base station.

In various embodiments, the at least one processor may be configured, when executing the instructions, to control the electronic device to: transmit a message indicating that a change of user equipment (UE) capability information is required, to the second base station, in a state of the electronic device being coupled to the network through the second base station after the performing the cell re-selection, and transmit the information indicating the band combination configured with the second bands after transmitting the message.

A base station of various embodiments described above may include at least one memory including instructions, communication circuitry, and at least one processor operatively coupled to the at least one memory and the communication circuitry. The at least one processor may be configured, when executing the instructions, to control the base station to: transmit information indicating a plurality of bands supportable in a network to an external electronic device, and receive information about a band combination configured with bands which are available in the external electronic device for carrier aggregation (CA) and are identified by the external electronic device from among the plurality of bands, from the external electronic device.

In various embodiments, the at least one processor may be configured, when executing the instructions, to control the base station to: transmit a message requesting to transmit a band combination available for CA to the external electronic device, and receive the information as a response to the transmitted message. For example, the message transmitted from the base station may correspond to a user equipment (UE) capability enquiry message, and the information received from the external electronic device may be included in a UE capability information message.

In various embodiments, the information indicating the plurality of bands may be included in a system information message transmitted from the base station. For example, the system information message may include information related with inter-frequency cell re-selection.

In various embodiments, the at least one processor may be further configured, when executing the instructions, to control the base station to: provide the information received from the external electronic device to a mobility management entity (MME) to store the information received from the external electronic device.

Figure 3A:
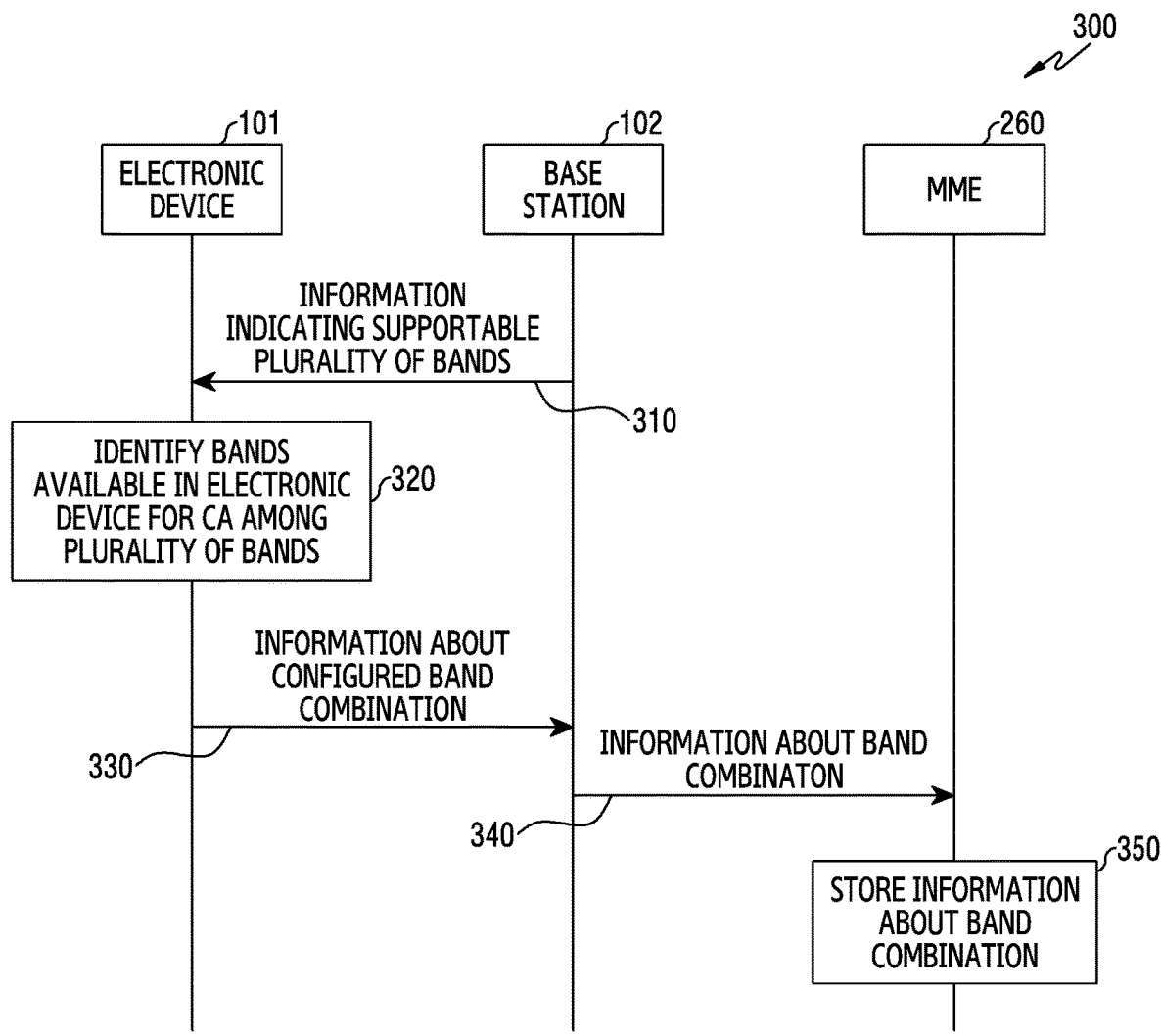
FIG. 3A is a sequence diagram illustrating an example of signaling between an electronic device and other electronic devices according to various embodiments.

FIG. 3A is a sequence diagram illustrating an example of signaling 300 between an electronic device and other electronic devices according to various embodiments. This signaling may be triggered between the electronic device 101, the base station 102, or an MME (e.g., the mobility management entity (MME) 260 of FIG. 2).

Referring to FIG. 3A, in operation 310, the base station 102 may transmit, to the electronic device 101, information indicating a plurality of bands supportable in a network (or information for indicating a plurality of frequencies). In various embodiments, the plurality of bands (or the plurality of frequencies) may include a frequency related with a cell supported by the base station 102. In various embodiments, the plurality of bands (or the plurality of frequencies) may include a frequency related with a neighboring cell of the base station 102. In various embodiments, the plurality of bands (or the plurality of frequencies) may be related with an RAT supported by the base station 102 as well, and may be related with another RAT distinct from the RAT supported by the base station 102 as well. For example, when the base station 102 is a base station supporting the LTE standard, the plurality of bands may be bands supportable in order to provide a cellular communication service of the LTE standard. For another example, when the base station 102 is a base station supporting the 2G standard or a base station supporting the 3G standard, the plurality of frequencies may be frequencies supportable in order to provide a cellular communication service of the 2G standard or the 3G standard. However, the disclosure is not limited to this. In various embodiments, the information may be included in a system information message. For example, when the base station 102 provides a cellular communication service using the LTE standard, the system information message may be configured, for example, and without limitation, as shown in Table 1 below.

TABLE 1

```
-- ASN1START
SystemInformationBlockType5 ::=         SEQUENCE {
        interFreqCarrierFreqList        InterFreqCarrierFreqList,
        ...,
        lateNonCriticalExtension        OCTET    STRING    (CONTAINING
SystemInformationBlockType5-v8h0-IEs) OPTIONAL,
        [[      interFreqCarrierFreqList-v1250   InterFreqCarrierFreqList-v1250
OPTIONAL,   -- Need OR
                interFreqCarrierFreqListExt-r12  InterFreqCarrierFreqListExt-r12
OPTIONAL     -- Need OR
        ]],
        [[      interFreqCarrierFreqListExt-v1280InterFreqCarrierFreqListExt-v1280
OPTIONAL    -- Need OR
        ]],
        [[      interFreqCarrierFreqList-v1310         InterFreqCarrierFreqList-
v1310       OPTIONAL,   -- Need OR
                interFreqCarrierFreqListExt-v1310InterFreqCarrierFreqListExt-v1310
OPTIONAL          -- Need OR
        ]],
        [[      interFreqCarrierFreqList-v1350         InterFreqCarrierFreqList-
v1350 OPTIONAL,       -- Need OR
        interFreqCarrierFreqListExt-v1350InterFreqCarrierFreqListExt-v1350
OPTIONAL            -- Need OR
        ]],
        [[      interFreqCarrierFreqListExt-v1360InterFreqCarrierFreqListExt-v1360
OPTIONAL        -- Need OR
        ]],
        [[      scptm-FreqOffset-r14                     INTEGER (1..8)
                        OPTIONAL    -- Need OP
        ]]
}
SystemInformationBlockType5-v8h0-IEs ::=      SEQUENCE {
        interFreqCarrierFreqList-v8h0   SEQUENCE   (SIZE  (1..maxFreq))   OF
InterFreqCarrierFreqInfo-v8h0                       OPTIONAL,   -- Need OP
        nonCriticalExtension                    SystemInformationBlockType5-
v9e0-IEs                                                        OPTIONAL
}
SystemInformationBlockType5-v9e0-IEs ::=      SEQUENCE {
        interFreqCarrierFreqList-v9e0   SEQUENCE   (SIZE  (1..maxFreq))   OF
InterFreqCarrierFreqInfo-v9e0                       OPTIONAL,   --    Need
OR
        nonCriticalExtension                    SystemInformationBlockType5-
v10j0-IEs       OPTIONAL
}
SystemInformationBlockType5-v10j0-IEs ::=      SEQUENCE {
        interFreqCarrierFreqList-v10j0   SEQUENCE   (SIZE   (1.. maxFreq))   OF
InterFreqCarrierFreqInfo-v10j0                      OPTIONAL,   --    Need
OR
        nonCriticalExtension                    SystemInformationBlockType5-
v1010-IEs                                                       OPTIONAL
}
SystemInformationBlockType5-v1010-IEs ::=     SEQUENCE {
        interFreqCarrierFreqList-v1010   SEQUENCE   (SIZE   (1.. maxFreq))   OF
InterFreqCarrierFreqInfo-v1010                      OPTIONAL,   --    Need
OR
        nonCriticalExtension                    SEQUENCE { }
                        OPTIONAL
}
InterFreqCarrierFreqList ::=            SEQUENCE   (SIZE   (1.. maxFreq))   OF
InterFreqCarrierFreqInfo
InterFreqCarrierFreqList-v1250 ::=SEQUENCE     (SIZE     (1.. maxFreq))     OF
InterFreqCarrierFreqInfo-v1250
InterFreqCarrierFreqList-v1310 ::=SEQUENCE     (SIZE     (1.. maxFreq))     OF
InterFreqCarrierFreqInfo-v1310
InterFreqCarrierFreqList-v1350 ::=SEQUENCE     (SIZE     (1.. maxFreq))     OF
InterFreqCarrierFreqInfo-v1350
InterFreqCarrierFreqListExt-r12 ::=      SEQUENCE   (SIZE   (1.. maxFreq))   OF
InterFreqCarrierFreqInfo-r12
```

TABLE 1-continued

```
InterFreqCarrierFreqListExt-v1280 ::=    SEQUENCE   (SIZE    (1.. maxFreq))   OF
    InterFreqCarrierFreqInfo-v10j0
InterFreqCarrierFreqListExt-v1310 ::=    SEQUENCE   (SIZE    (1.. maxFreq))   OF
    InterFreqCarrierFreqInfo-v1310
InterFreqCarrierFreqListExt-v1350 ::=    SEQUENCE   (SIZE    (1.. maxFreq))   OF
    InterFreqCarrierFreqInfo-v1350
InterFreqCarrierFreqListExt-v1360 ::=    SEQUENCE   (SIZE    (1..maxFreq))    OF
    InterFreqCarrierFreqInfo-v1360
InterFreqCarrierFreqInfo ::=        SEQUENCE {
        dl-CarrierFreq                              ARFCN-ValueEUTRA,
        q-RxLevMin                                  Q-RxLevMin,
        p-Max                                       P-Max
                                OPTIONAL,           -- Need OP
        t-ReselectionEUTRA                          T-Reselection,
        t-ReselectionEUTRA-SF                       SpeedStateScaleFactors
            OPTIONAL,           -- Need OP
        threshX-High                                ReselectionThreshold,
        threshX-Low                                 ReselectionThreshold,
        allowedMeasBandwidth                        AllowedMeasBandwidth,
        presenceAntennaPort1                        PresenceAntennaPort1,
        cellReselectionPriority                     CellReselectionPriority
            OPTIONAL,           -- Need OP
        neighCellConfig                             NeighCellConfig,
        q-OffsetFreq                                Q-OffsetRange
                                DEFAULT dB0,
        interFreqNeighCellList                      InterFreqNeighCellList
            OPTIONAL,           -- Need OR
        interFreqBlackCellList                      InterFreqBlackCellList
            OPTIONAL,           -- Need OR
        ...,
        [[   q-QualMin-r9                           Q-QualMin-r9
                                OPTIONAL,           -- Need OP
             threshX-Q-r9                           SEQUENCE {
                 threshX-HighQ-r9                   ReselectionThresholdQ-r9,
                 threshX-LowQ-r9                    ReselectionThresholdQ-r9
             }                                      OPTIONAL
             -- Cond RSRQ
        ]],
        [[   q-QualMinWB-r11                        Q-QualMin-r9        OPTIONAL    -- Cond WB-RSRQ
        ]]
}
InterFreqCarrierFreqInfo-v8h0 ::=    SEQUENCE {
    multiBandInfoList                               MultiBandInfoList
                    OPTIONAL    -- Need OR
}
InterFreqCarrierFreqInfo-v9e0 ::= SEQUENCE {
    dl-CarrierFreq-v9e0                             ARFCN-ValueEUTRA-v9e0    OPTIONAL,    -- Cond dl-FreqMax
    multiBandInfoList-v9e0                          MultiBandInfoList-v9e0
        OPTIONAL    -- Need OR
}
InterFreqCarrierFreqInfo-v10j0 ::=SEQUENCE {
    freqBandInfo-r10                                NS-PmaxList-r10
            OPTIONAL,   -- Need OR
    multiBandInfoList-v10j0                         MultiBandInfoList-v10j0
        OPTIONAL    -- Need OR
}
InterFreqCarrierFreqInfo-v1010 ::=SEQUENCE {
    freqBandInfo-v1010                              NS-PmaxList-v1010
                OPTIONAL,   -- Need OR
    multiBandInfoList-v1010                         MultiBandInfoList-v1010
        OPTIONAL    -- Need OR
}
InterFreqCarrierFreqInfo-v1250 ::=        SEQUENCE {
    reducedMeasPerformance-r12             ENUMERATED {true}
        OPTIONAL,           -- Need OP
    q-QualMinRSRQ-OnAllSymbols-r12     Q-QualMin-r9
            OPTIONAL    -- Cond RSRQ2
}
InterFreqCarrierFreqInfo-r12 ::=        SEQUENCE {
    dl-CarrierFreq-r12                              ARFCN-ValueEUTRA-r9,
```

TABLE 1-continued

```
        q-RxLevMin-r12                      Q-RxLevMin,
        p-Max-r12                           P-Max
                        OPTIONAL,           -- Need OP
        t-ReselectionEUTRA-r12              T-Reselection,
        t-ReselectionEUTRA-SF-r12           SpeedStateScaleFactors
                OPTIONAL,       -- Need OP
        threshX-High-r12
ReselectionThreshold,
        threshX-Low-r12
ReselectionThreshold,
        allowedMeasBandwidth-r12            AllowedMeasBandwidth,
        presenceAntennaPort1-r12            PresenceAntennaPort1,
        cellReselectionPriority-r12         CellReselectionPriority
                OPTIONAL,       -- Need OP
        neighCellConfig-r12                 NeighCellConfig,
        q-OffsetFreq-r12                    Q-OffsetRange
                DEFAULT dB0,
        interFreqNeighCellList-r12          InterFreqNeighCellList
                OPTIONAL,       -- Need OR
        interFreqBlackCellList-r12          InterFreqBlackCellList
                OPTIONAL,       -- Need OR
        q-QualMin-r12                       Q-QualMin-r9
                        OPTIONAL,           -- Need OP
        threshX-Q-r12                       SEQUENCE {
            threshX-HighQ-r12
ReselectionThresholdQ-r9,
            threshX-LowQ-r12
ReselectionThresholdQ-r9
        }
                                            OPTIONAL,       --
Cond RSRQ
        q-QualMinWB-r12                     Q-
QualMin-r9              OPTIONAL,   -- Cond WB-RSRQ
        multiBandInfoList-r12               MultiBandInfoList-r11
                OPTIONAL,       -- Need OR
        reducedMeasPerformance-r12          ENUMERATED {true}
                OPTIONAL,       -- Need OP
        q-QualMinRSRQ-OnAllSymbols-r12      Q-QualMin-r9
                OPTIONAL,       -- Cond RSRQ2
   ...
}
InterFreqCarrierFreqInfo-v1310  ::=    SEQUENCE {
        cellReselectionSubPriority-r13      CellReselectionSubPriority-r13
        OPTIONAL,           -- Need OP
        redistributionInterFreqInfo-r13     RedistributionInterFreqInfo-r13
        OPTIONAL, --Need OP
        cellSelectionInfoCE-r13             CellSelectionInfoCE-r13
                OPTIONAL,       -- Need OP
        t-ReselectionEUTRA-CE-r13           T-ReselectionEUTRA-CE-
r13     OPTIONAL    -- Need OP
}
InterFreqCarrierFreqInfo-v1350  ::=SEQUENCE {
        cellSelectionInfoCE1-r13            CellSelectionInfoCE1-r13
        OPTIONAL    -- Need OP
}
InterFreqCarrierFreqInfo-v1360   ::= SEQUENCE {
        cellSelectionInfoCE1-v1360          CellSelectionInfoCE1-v1360
        OPTIONAL    -- Cond QrxlevminCE1
}
InterFreqNeighCellList ::=              SEQUENCE        (SIZE
(1..maxCellInter)) OF InterFreqNeighCellInfo
InterFreqNeighCellInfo ::=              SEQUENCE {
        physCellId
        PhysCellId,
        q-OffsetCell                        Q-OffsetRange
}
InterFreqBlackCellList ::=              SEQUENCE        (SIZE
(1..maxCellBlack)) OF PhysCellIdRange
RedistributionInterFreqInfo-r13 ::=     SEQUENCE {
        redistributionFactorFreq-r13        RedistributionFactor-r13
        OPTIONAL,   --Need OP
        redistributionNeighCellList-r13
        RedistributionNeighCellList-r13     OPTIONAL    --Need OP
}
```

TABLE 1-continued

```
RedistributionNeighCellList-r13 ::=         SEQUENCE         (SIZE
(1..maxCellInter)) OF RedistributionNeighCell-r13
RedistributionNeighCell-r13 ::=      SEQUENCE {
    physCellId-r13
    PhysCellId,
    redistributionFactorCell-r13
    RedistributionFactor-r13
}
RedistributionFactor-r13 ::=      INTEGER(1..10)
-- ASN1STOP
```

For another example, in response to the base station 102 providing a cellular communication service using the 3G standard, the system information message may, for example, and without limitation, be configured as shown in Table 2 below.

TABLE 2

```
Reference: 3GPP TS 36.508 clause 4.4.4.1
Derivation Path: 25.331 clause 11.3
SysInfoType19 ::= SEQUENCE {
-- Measurement IEs
utra-PriorityInfoList UTRA-PriorityInfoList,
gsm-PriorityInfoList GSM-PriorityInfoList OPTIONAL,
eutra-FrequencyAndPriorityInfoList EUTRA-
FrequencyAndPriorityInfoList OPTIONAL,
-- Extension mechanism for non-release8 information
v920NonCriticalExtensions SEQUENCE {
sysInfoType19-v920ext SysInfoType19-v920ext,
nonCriticalExtensions SEQUENCE { } OPTIONAL
} OPTIONAL
```

For further example, in response to the base station 102 providing a cellular communication service using the 2G standard, the system information message may, for example, and without limitation, be configured as shown in Table 3 below.

TABLE 3

Reference: 3GPP 44.060
5.5.1.10 Acquisition of E-UTRAN Information on the PACCH
see sub-clause 11.2.9b) shall be added to the E-UTRAN Neighbour Cell list built by the last receivedconsistent set of SI2 quarter message instances, The electronic device 101 may receive information indicating the plurality of bands (or the plurality of frequencies) which are broadcasted or transmitted from the base station 102.

In operation 320, the electronic device 101 may identify bands available for CA among the plurality of bands. The electronic device 101 may configure or obtain a band combination configured with the bands which are identified among the plurality of bands. In other words, unlike a device of configuring a band combination using bands available by itself for CA independently from the plurality of bands, the electronic device 101 may configure a band combination using the bands available for CA among the plurality of bands.

In operation 330, the electronic device 101 may transmit information about the configured band combination to the base station 102. In various embodiments, the electronic device 101 may transmit, to the base station 102, the information about the band combination, based on receiving a request for enquiring information about a capability of the electronic device 101 related with cellular communication received from the base station 102. For example, the request may be a UE capability enquiry message. In response to the request being the UE capability enquiry message, the information about the band combination may be included in a UE capability information message. However, the disclosure is not limited to this. Meantime, the base station 102 may receive the information about the band combination from the electronic device 101.

In operation 340, the base station 102 may provide the information about the band combination to the MME 260. To provide a service using CA to the electronic device 101, the base station 102 may provide the information about the band combination to the MME 260. Meantime, the MME 260 may obtain the information about the band combination from the base station 102.

In operation 350, the MME 260 may store the information about the band combination in a memory (not shown) included in the MME 260.

As described above, instead of configuring the information about the band combination using all bands available in the electronic device 101, the electronic device 101 of various embodiments may identify bands, which are available for CA in the electronic device 101, from among the plurality of bands (or the plurality of frequencies) indicated by information received from the base station 102, and configure the information about the band combination using the identified bands. Through the configuring of the information about the band combination, the electronic device 101 may not only reduce a load of a network but also enhance a resource efficiency of the network.

Figure 3B:
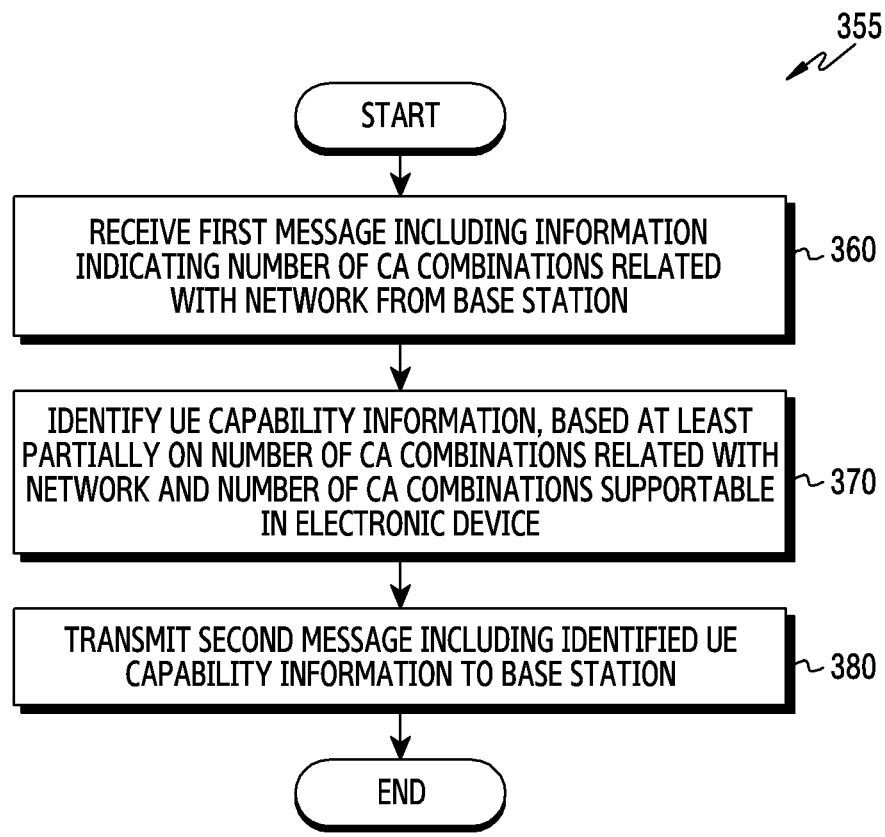
FIG. 3B is a flowchart illustrating an example operation of an electronic device according to various embodiments.

FIG. 3B is a flowchart illustrating an example operation 355 of an electronic device according to various embodiments. This operation may be performed by the electronic device 101 shown in FIG. 1, the electronic device 101 shown in FIG. 2, or the processor 120 of the electronic device 101.

Referring to FIG. 3B, in operation 360, the processor 120 may receive, from the base station 102, a first message related with UE capability enquiry including information indicating the number of CA combinations related with a network associated with the base station 102. In various embodiments, the first message may include a system information message (e.g., a system information block type 5 (SIB 5) in the LTE standard). In various embodiments, the number of CA combinations related with the network may include at least one of the number of CA combinations supported by a cell of the base station 102 or the number of CA combinations supported by a neighboring cell of the base station 102.

In operation 370, the processor 120 may identify UE capability information, based at least partially (in part) on the number of CA combinations related with the network and the number of CA combinations supportable in the electronic device 101. In various embodiments, the processor 120 may identify information about a band combination that will be used in the electronic device 101 transceiving a traffic using CA, based at least partially on the number of CA combinations related with the network and the number of CA combinations supportable in the electronic device 101 and, by including the identified information about the band combination in the UE capability information, the processor 120 may identify the UE capability information.

In operation 380, the processor 120 may transmit, to the base station 102, a second message including the identified UE capability information. In various embodiments, the second message may be transmitted as a response to a request of the base station 102. For example, in response to the base station 102 being a base station performing cellular communication using the LTE standard, the second message may be a UE capability information message transmitted as a response to a UE capability enquiry message. However, the disclosure is not limited to this.

Though not illustrated in FIG. 3B, after transmitting the second message including the identified UE capability information, the processor 120 may receive information about a changed network different from the network. The processor 120 may again identify UE capability information, based at least partially on the number of CA combinations related with the changed network included in the information about the changed network and the number of CA combinations supportable in the electronic device 101. The processor 120 may transmit a second message including the re-identified UE capability information.

As described above, by obtaining or configuring information about a band combination that will be used for CA using not only information about bands available in the electronic device 101 but also information about bands received from a network, the electronic device 101 of various embodiments may reduce a load of the network and/or enhance a resource efficiency of the network.

Figure 4:
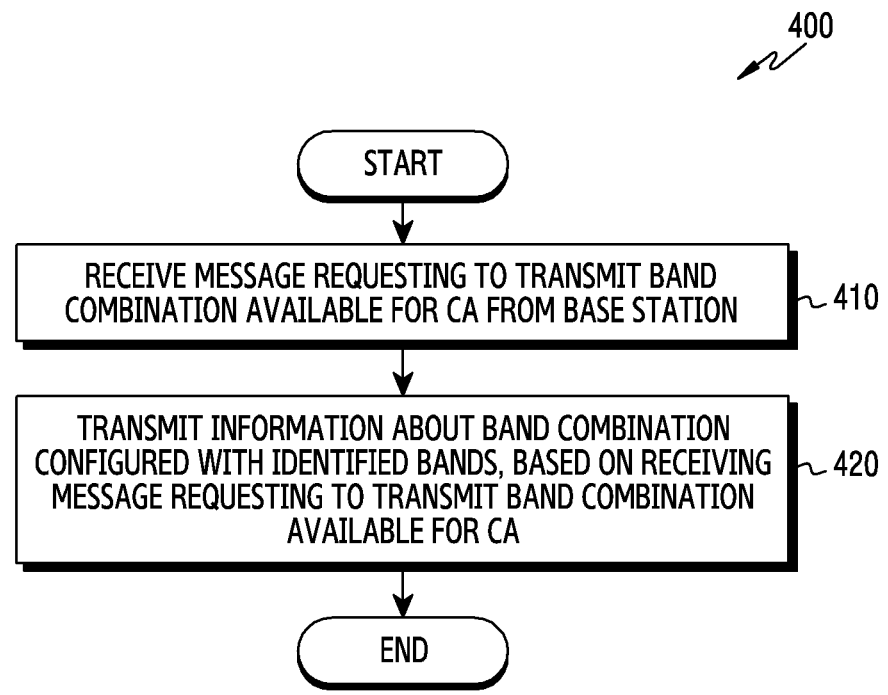
FIG. 4 is a flowchart illustrating an example operation of an electronic device of transmitting information about a band combination according to various embodiments.

FIG. 4 is a flowchart illustrating an example operation 400 of an electronic device of transmitting information about a band combination according to various embodiments. This operation may be performed by the electronic device 101 shown in FIG. 1, the electronic device 101 shown in FIG. 2, or the processor 120 of the electronic device 101.

Operation 410 and operation 420 of FIG. 4 may be related with operation 330 of FIG. 3A.

Referring to FIG. 4, in operation 410, the processor 120 may receive, from the base station 102, a message requesting to transmit a band combination available for CA. In various embodiments, the message may be used to request a capability of the electronic device 101 related with cellular communication. For example, the message may be not only used to request to transmit the band combination available for CA but also may be used to request the maximum number of component carriers (CC) available when the electronic device 101 uses CA. For another example, in response to the message being a UE capability enquiry message, the message may, for example, and without limitation, be configured as shown in Table 4 below.

TABLE 4

```
-- ASN1START
UECapabilityEnquiry ::=              SEQUENCE {
    rrc-TransactionIdentifier        RRC-TransactionIdentifier,
    criticalExtensions               CHOICE {
        c1
        CHOICE {
            ueCapabilityEnquiry-r8
    UECapabilityEnquiry-r8-IEs,
            spare3 NULL, spare2 NULL, spare1 NULL
        },
        criticalExtensionsFuture     SEQUENCE { }
    }
}
UECapabilityEnquiry-r8-IEs ::=       SEQUENCE {
    ue-CapabilityRequest             UE-CapabilityRequest,
    nonCriticalExtension             UECapabilityEnquiry-
v8a0-IEs                             OPTIONAL
}
UECapabilityEnquiry-v8a0-IEs ::=SEQUENCE {
    lateNonCriticalExtension         OCTET STRING
                         OPTIONAL,
    nonCriticalExtension             UECapabilityEnquiry-
v1180-IEs                                         OPTIONAL
}
UECapabilityEnquiry-v1180-IEs ::=    SEQUENCE {
    requestedFrequencyBands-r11               SEQUENCE   (SIZE
(1..16)) OF FreqBandIndicator-r11
         OPTIONAL,
    nonCriticalExtension             UECapabilityEnquiry-
v1310-IEs                                         OPTIONAL
}
UECapabilityEnquiry-v1310-IEs ::=    SEQUENCE {
    requestReducedFormat-r13                  ENUMERATED {true}
                         OPTIONAL,   -- Need ON
    requestSkipFallbackComb-r13               ENUMERATED {true}
                         OPTIONAL,   -- Need ON
    requestedMaxCCsDL-r13                     INTEGER       (2..32)
                         OPTIONAL,   -- Need ON
    requestedMaxCCsUL-r13                     INTEGER       (2..32)
                         OPTIONAL,   -- Need ON
    requestReducedIntNonContComb-r13          ENUMERATED {true}
                         OPTIONAL,   -- Need ON
    nonCriticalExtension                      UECapabilityEnquiry-
v1430-IEs            OPTIONAL
```

TABLE 4-continued

```
}
UECapabilityEnquiry-v1430-IEs ::=        SEQUENCE {
        requestDiffFallbackCombList-r14          BandCombinationList-r14
                OPTIONAL,        -- Need ON
        nonCriticalExtension                     UECapabilityEnquiry-
v1510-IEs      OPTIONAL
}
UECapabilityEnquiry-v1510-IEs ::=        SEQUENCE {
        requestedFreqBandsNR-MRDC-r15            OCTET STRING
                        OPTIONAL,
        nonCriticalExtension                     SEQUENCE { }
                        OPTIONAL
}
UE-CapabilityRequest ::=                 SEQUENCE   (SIZE    (1..maxRAT-
Capabilities)) OF RAT-Type
-- ASN1STOP
```

In operation 420, the processor 120 may transmit information about a band combination configured with identified bands, based on receiving, from the base station 102, the message requesting to transmit the band combination available for CA. For example, the processor 120 may transmit the information about the band combination configured with the bands identified in operation 320, as a response to the message received from the base station 102. In various embodiments, the information about the band combination configured with the identified bands may be included in a UE capability information message. For example, the UE capability information message may, for example, and without limitation, be configured as shown in Table 5 below.

Figure 5:
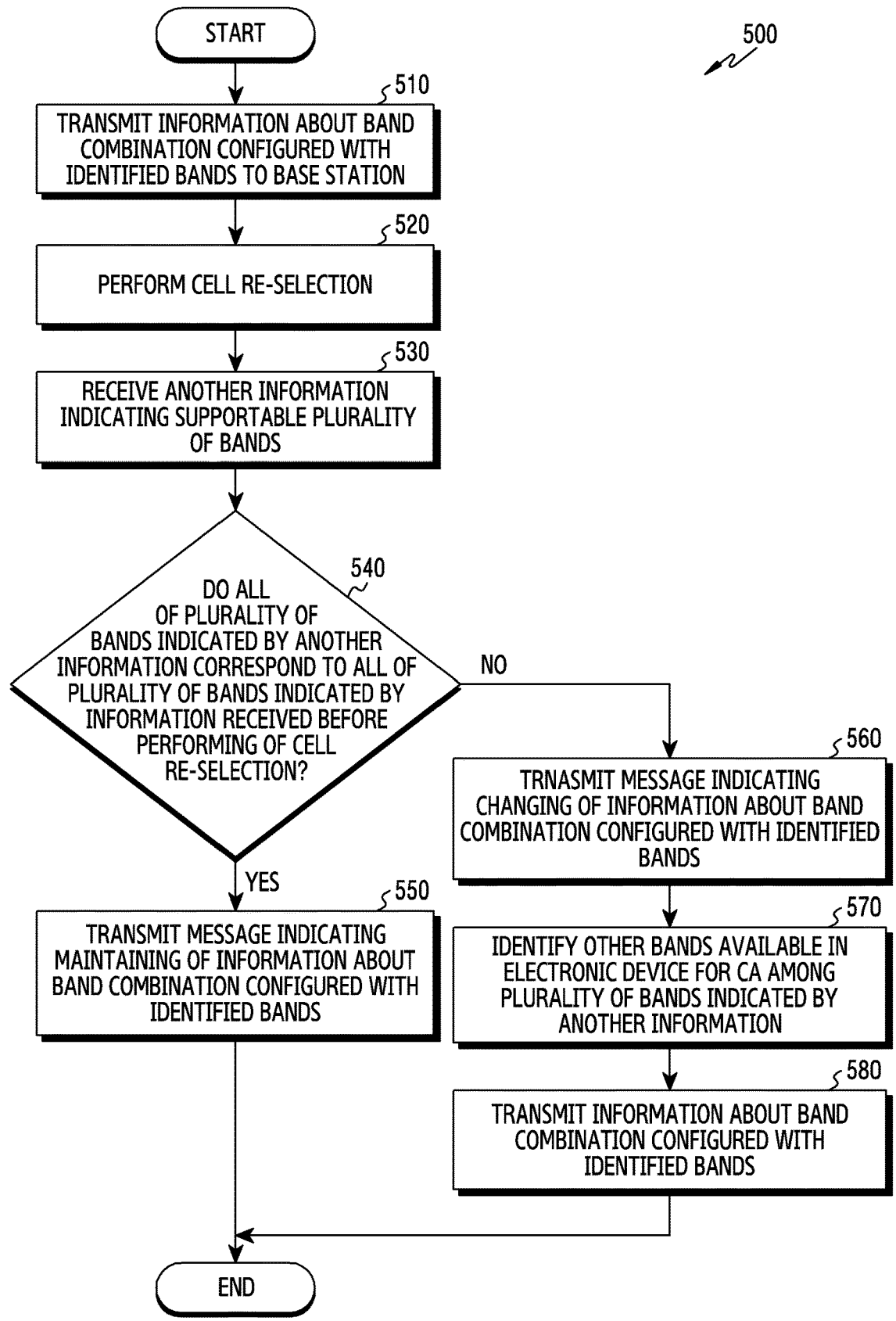
FIG. 5 is a flowchart illustrating an example operation of an electronic device of transmitting information about a band combination after performing cell re-selection according to various embodiments.

Operation 520, 530, 540, 550, 560, 570 and operation 580 of FIG. 5 may be performed after the performing of operation 330 of FIG. 3A in the electronic device 101.

Referring to FIG. 5, in operation 510, the processor 120 may, as in operation 330, transmit, to the base station 102, information about a band combination configured with bands identified among a plurality of bands (or a plurality of frequencies) indicated by information received from the base station 102.

In operation 520, the processor 120 may perform cell re-selection. For example, the processor 120 may perform the cell re-selection (or handover), based on a change of a

TABLE 5

```
-- ASN1START
UECapabilityInformation ::=
        rrc-TransactionIdentifier                SEQUENCE {
        criticalExtensions                       RRC-TransactionIdentifier,
                                                 CHOICE {
            c1
            CHOICE{
                    ueCapabilityInformation-r8
        UECapabilityInformation-r8-IEs,
                    spare7 NULL,
                    spare6 NULL, spare5 NULL, spare4 NULL,
                    spare3 NULL, spare2 NULL, spare1 NULL
            },
            criticalExtensionsFuture             SEQUENCE { }
        }
}
UECapabilityInformation-r8-IEs ::=       SEQUENCE {
        ue-CapabilityRAT-ContainerList           UE-CapabilityRAT-ContainerList,
        nonCriticalExtension
        UECapabilityInformation-v8a0-IEs         OPTIONAL
}
UECapabilityInformation-v8a0-IEs ::= SEQUENCE {
        lateNonCriticalExtension         OCTET STRING
                        OPTIONAL,
        nonCriticalExtension
        UECapabilityInformation-v1250-IEs    OPTIONAL
}
UECapabilityInformation-v1250-IEs ::= SEQUENCE {
        ue-RadioPagingInfo-r12                   UE-RadioPagingInfo-r12
                        OPTIONAL,
        nonCriticalExtension                     SEQUENCE { }
                        OPTIONAL
}
-- ASN1STOP
```

FIG. 5 is a flowchart illustrating an example operation 500 of an electronic device of transmitting information about a band combination after performing cell re-selection according to various embodiments. This operation may be performed by the electronic device 101 shown in FIG. 1, the electronic device 101 shown in FIG. 2, or the processor 120 of the electronic device 101.

wireless environment including the electronic device 101 or a change of a location of the electronic device 101.

In operation 530, after performing the cell re-selection, the processor 120 may receive another information indicating a plurality of bands supportable in a network. In various embodiments, the another information may be distinct from the information received in operation 310. For example, the another information may mean information transmitted from another base station distinct from the base station 102. However, the disclosure is not limited to this.

In operation 540, the processor 120 may identify whether all of the plurality of bands indicated by the another information correspond to all of the plurality of bands indicated by the information (e.g., the information received in operation 310) received before performing the cell re-selection. In response to all of the plurality of bands indicated by the another information corresponding to all of the plurality of bands indicated by the information received before the performing of the cell re-selection, the processor 120 may perform operation 550. In response to at least some of the plurality of bands indicated by the another information being different from at least some of the plurality of bands indicated by the information received before the performing of the cell re-selection, the processor 120 may perform operation 560, 570 and operation 580.

In operation 550, the processor 120 may transmit a message indicating the maintaining of the information about the band combination configured with the bands identified in operation 320, based on identifying that all of the plurality of bands indicated by the another information received after the performing of the cell re-selection corresponding to all of the plurality of bands indicated by the information received before the performing of the cell re-selection. For example, in response to a base station (e.g., may be the same as or be different from the base station 102) connected after the performing of the cell re-selection providing a cellular communication service using the LTE standard, the processor 120 may indicate, to the base station, the maintaining of the information about the band combination configured with the bands identified in operation 320 (e.g., the information about the band combination stored in the MME 260) using TRACKING AREA UPDATE REQUEST with UE radio capability information update not needed. However, the disclosure is not limited to this.

In operation 560, the processor 120 may transmit a message for indicating the changing of the information about the band combination configured with the bands identified in operation 320, based on identifying that at least some of the plurality of bands indicated by the another information received after the performing of the cell re-selection being different from at least some of the plurality of bands indicated by the information received before the performing of the cell re-selection. For example, in response to a base station (e.g., may be the same as or be different from the base station 102) connected after the performing of the cell re-selection providing a cellular communication service using the LTE standard, the processor 120 may indicate, to the base station, the changing of the information about the band combination configured with the bands identified in operation 320 (e.g., the information about the band combination stored in the MME 260) using TRACKING AREA UPDATE REQUEST with UE radio capability update needed. However, the disclosure is not limited to this.

In various embodiments, the base station receiving the message for indicating the changing of the information about the band combination configured with the identified bands transmitted from the electronic device 101 may provide the received message to the MME 260. The MME 260 may discard or delete the information about the band combination stored in operation 350, based on the message obtained from the base station.

In operation 570, the processor 120 may identify other bands, which are available in the electronic device 101 for CA, among the plurality of bands indicated by the another information received in operation 530. In various embodiments, some of the identified other bands may be identical with some of the bands identified in operation 320 as well.

FIG. 5 illustrates an example of performing operation 570 after performing operation 560, but operation 560 and operation 570 may be performed regardless of order. For example, the processor 210 may perform operation 560 and operation 570 at the same time as well, and may perform operation 560 after performing operation 570 as well. However, the disclosure is not limited to this.

In operation 580, the processor 120 may transmit the information about the band combination configured with the bands identified in operation 570. The information about the band combination transmitted from the electronic device 101 may be stored in the MME 260 through the base station.

As described above, when a wireless environment in which the electronic device 101 is located is changed like cell re-selection or handover, the electronic device 101 of various embodiments may compare bands received from the base station with bands received before from the base station and perform a different operation according to the comparison result, thereby reducing a load of a network and enhancing a resource efficiency of the network.

Figure 6:
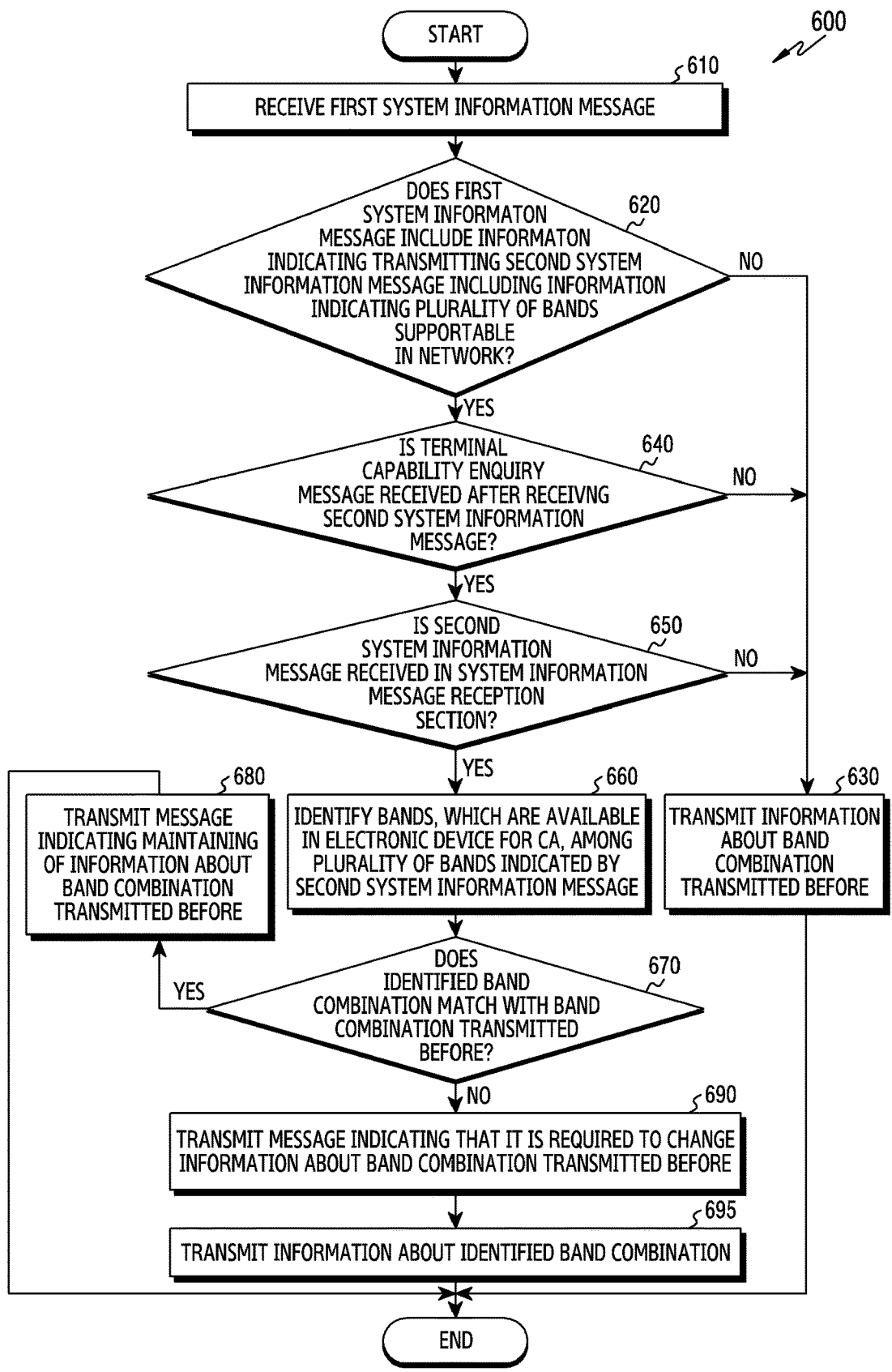
FIG. 6 is a flowchart illustrating an example operation of an electronic device of transmitting information about a band combination according to various embodiments.

FIG. 6 is a flowchart illustrating an example operation 600 of an electronic device of transmitting information about a band combination according to various embodiments. This operation may be performed by the electronic device 101 shown in FIG. 1, the electronic device 101 shown in FIG. 2, or the processor 120 of the electronic device 101.

Referring to FIG. 6, in operation 610, the processor 120 may receive a first system information message from the base station 102. In various embodiments, in response to the base station 102 providing a cellular communication service using the LTE standard, the first system information message may be a system information block type 1 (SIB 1). However, the disclosure is not limited to this. In various embodiments, the first system information message may include information for indicating whether the base station 102 transmits a second system information message to be described later.

In operation 620, the processor 120 may identify whether the received first system information message includes information indicating the transmitting of the second system information message which includes information indicating a plurality of bands supportable in a network. In response to the first system information message not including the information indicating the transmitting of the second system information message, the processor 120 may perform operation 630. In response to the first system information message including the information for indicating the transmitting of the second system information message, the processor 120 may perform operation 640.

In operation 630, the processor 120 may transmit, to the base station 102, information about a band combination transmitted before according to operation 330, based on identifying that the first system information message does not include the information for indicating that the base station 102 transmits the second system information message. For example, the band combination may be configured with bands identified before according to operation 320.

In operation 640, the processor 120 may identify whether it receives a terminal capability enquiry message (e.g., a UE capability enquiry message) after receiving the second system information message, based on identifying that the first system information message includes the information for indicating that the base station 102 transmits the second system information message. In response to receiving the terminal capability enquiry message before receiving the second system information message, the processor 120 may perform operation 630. For example, the processor 120 may transmit information about a band combination transmitted before according to operation 330 to the base station 102, based on identifying the receiving of the terminal capability enquiry message before the receiving of the second system information message. Unlike this, in response to receiving the terminal capability enquiry message after receiving the second system information message, the processor 120 may perform operation 650.

In operation 650, the processor 120 may identify whether it has received the second system information message within a system information message reception section (e.g., a SIB timer active section), based on identifying the receiving of the terminal capability enquiry message after the receiving of the second system information message. The processor 120 may perform operation 630, based on identifying the non-receiving of the second system information message within the system information message reception section. For example, the processor 120 may transmit information about a band combination transmitted before according to operation 330 to the base station 102, based on identifying the non-receiving of the second system information message within the system information message reception section. The processor 120 may perform operation 660, based on identifying the receiving of the second system information message within the system information message reception section.

In operation 660, the processor 120 may identify bands, which are available in the electronic device 101 for CA, among a plurality of bands indicated by the second system information message (e.g., SIB 5), based on identifying the receiving of the second system information message within the system information message reception section. The processor 120 may identify a band combination using the identified bands.

In operation 670, the processor 120 may identify whether the band combination identified in operation 660 matches with a band combination transmitted before. In response to the band combination identified in operation 660 matching with the band combination transmitted before, the processor 120 may perform operation 680. In response to at least a portion of the band combination identified in operation 660 being different from at least a portion of the band combination transmitted before, the processor 120 may perform operation 690.

In operation 680, the processor 120 may transmit, to the base station 101, a message indicating the maintaining of the information about the band combination transmitted before, based on identifying that the band combination identified in operation 660 matches with the band combination transmitted before (e.g., a band combination for the electronic device 101 that is being currently stored in the MME 260). The processor 120 may, as in operation 630, again transmit the information about the band combination transmitted before, based on identifying that the band combination identified in operation 660 matches with the band combination transmitted before, as well.

In operation 690, the processor 120 may transmit, to the base station 102, a message indicating that it is required to change the information about the band combination transmitted before (e.g., a band combination for the electronic device 101 that is being currently stored in the MIME 260), based on identifying that at least a portion of the band combination identified in operation 660 is different from at least a portion of the before transmitted band combination.

In operation 695, the processor 120 may transmit information about the band combination identified in operation 660, to the base station 102.

As described above, by transmitting information about a band combination transmitted before or transmitting information about a band combination changed according to a change of a wireless environment, the electronic device 101 of various example embodiments may more efficiently use a resource of a network than a device of transmitting information about a band combination on the basis of all bands available by itself.

Figure 7:
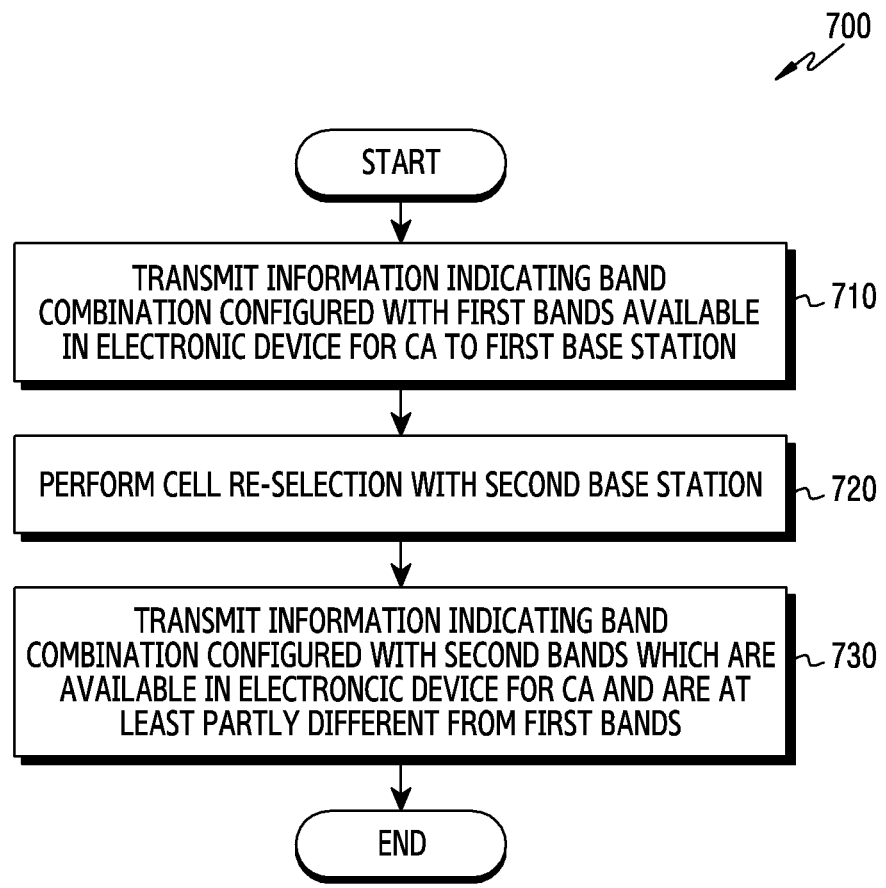
FIG. 7 is a flowchart illustrating another example operation of an electronic device according to various embodiments.

FIG. 7 is a flowchart illustrating another example operation 700 of an electronic device according to various embodiments. This operation may be performed by the electronic device 101 shown in FIG. 1, the electronic device 101 shown in FIG. 2, or the processor 120 of the electronic device 101.

Referring to FIG. 7, in operation 710, the processor 120 may transmit, to a first base station, information indicating a band combination configured with first bands which are available in the electronic device 101 for CA. In various embodiments, the processor 120 may transmit, to the first base station, the information for indicating the band combination configured with the first bands available in the electronic device 101 for CA, in a state of being coupled to a network through the first base station. For example, the first bands may be identified by performing operation such as operation 320.

In operation 720, the processor 120 may perform cell re-selection with a second base station. In various embodiments, the processor 120 may perform the cell re-selection with the second base station distinct from the first base station, after transmitting the information for indicating the band combination configured with the first bands.

In operation 730, after the performing of the cell re-selection, the processor 120 may transmit, to the second base station, information indicating a band combination configured with second bands which are available in the electronic device 101 for CA and are at least partially different from the first bands. In various embodiments, after the performing of the cell re-selection, the processor 120 may transmit, to the second base station, the information for indicating the band combination configured with the second bands available in the electronic device 101 for CA and at least partially different from the first bands, in a state of being coupled to the network through the second base station. For example, the first bands may be identified by performing operation such as operation 320.

In various embodiments, a size of the information for indicating the band combination configured with the first bands may be different from a size of the information for indicating the band combination configured with the second bands. For example, in response to the bands available in the first base station being at least partially different from the bands supportable in the second base station, the size of the information indicating the band combination configured with the first bands may be different from the size of the information indicating the band combination configured with the second bands.

For example, in response to the bands supportable in the first base station being at least partially different from the bands supportable in the second base station, the processor 120 may transmit, to the second base station, a message indicating that a change of terminal capability information is required, in a state of the electronic device being coupled to the network through the second base station. After transmitting the message, the processor 120 may transmit the information for indicating the band combination configured with the second bands.

As described above, in response to a wireless environment where the electronic device 101 is located being changed like cell re-selection, handover or the like, the electronic device 101 of various embodiments may not only provide information about a band combination of a reduced size but also provide a service robust to the change of the wireless environment, by providing the changed wireless environment with information about a band combination at least partially different from a band combination before change.

A method of operating an electronic device (e.g., the electronic device 101) of various embodiments described above may include receiving information for indicating a plurality of bands supportable in a network from a base station, and identifying bands which are available in the electronic device for carrier aggregation (CA), from among the plurality of bands, and transmitting information about a band combination configured with the identified bands to the base station.

In various embodiments, transmitting the information about the band combination may include receiving a message requesting to transmit a band combination available for CA from the base station, and transmitting the information about the band combination configured with the identified bands to the base station based on the receiving of the message. For example, the message received from the base station may correspond to a user equipment (UE) capability enquiry message, and the information about the band combination configured with the identified bands may be included in a UE capability information message.

In various embodiments, the information indicating the plurality of bands may be included in a system information message transmitted from the base station. For example, the system information message may include information related with inter-frequency cell re-selection.

In various embodiments, the information about the band combination configured with the identified bands transmitted from the electronic device may be stored in a mobility management entity (MME) through the base station.

In various embodiments, the method may further include performing cell re-selection after transmitting the information about the band combination configured with the identified bands, receiving another information indicating a plurality of bands supportable in the network after the performing the cell re-selection, and transmitting a message indicating the maintaining of the information about the band combination configured with the identified bands based on identifying that all of the plurality of bands indicated by the another information received after the performing of the cell re-selection correspond to all of the plurality of bands indicated by the information received before the performing of the cell re-selection.

In some embodiments, the method may further include transmitting a message indicating the changing of the information about the band combination configured with the identified bands transmitted before the performing of the cell re-selection based on identifying that at least some of the plurality of bands indicated by the another information received after the performing of the cell re-selection are different from at least some of the plurality of bands indicated by the information received before the performing of the cell re-selection. For example, the method may further include identifying other bands, which are available in the electronic device for carrier aggregation (CA), among the plurality of bands indicated by the another information received after the performing of the cell re-selection, based on transmitting the message for indicating the changing of the information about the band combination configured with the identified bands transmitted before the performing of the cell re-selection, and transmitting information about another band combination configured with the identified other bands.

In various embodiments, the method may further include receiving information for indicating a plurality of frequencies of a radio access technology (RAT) supportable in the network from another base station supporting another RAT distinct from the RAT supported by the base station, identifying bands which are available in the electronic device for CA, among the plurality of frequencies, and obtaining a band combination configured with the bands identified among the plurality of frequencies.

A method for operating an electronic device of various embodiments described above may include receiving, from a base station, a first message related with user equipment (UE) capability enquiry including information indicating the number of carrier aggregation (CA) combinations related with a network associated with the base station, identifying UE capability information based at least in part on the number of CA combinations related with the network and the number of CA combinations supportable in the electronic device, and transmitting a second message including the identified UE capability information, to the network.

In various embodiments, the method may include receiving a system information block (SIB) from the base station, and the SIB may include information related with the number of CA combinations associated with the network.

In various embodiments, the number of CA combinations associated with the network may include at least one of the number of CA combinations supported by a cell of the base station or the number of CA combinations supported by a neighboring cell of the base station.

In various embodiments, the method may include receiving changed network information different from the network information using the wireless communication circuitry, re-identifying UE capability information, based at least partially on the number of CA combinations associated with the changed network and the number of CA combinations supportable in the electronic device, and transmitting a second message including the re-identified UE capability information to the network, using the wireless communication circuitry.

In various embodiments, the UE capability information included in the second message may include data indicating the number of CA combinations to be used in the electronic device, identified based at least in part on the number of CA combinations related with the network and the number of CA combinations supported by the electronic device.

A method for operating an electronic device of various embodiments described above may include transmitting information indicating a band combination configured with first bands which are available in the electronic device for carrier aggregation (CA) to a first base station, in a state of the electronic device being coupled to a network through the first base station, and performing cell re-selection with a second base station distinct from the first base station after transmitting the information, and transmitting information indicating a band combination configured with second bands which are available in the electronic device for CA and are at least partially different from the first bands to the second base station, in a state of the electronic device being coupled to the network through the second base station after performing the cell re-selection.

In various embodiments, a size of the information for indicating the band combination configured with the first bands may be different from a size of the information for indicating the band combination configured with the second bands.

In various embodiments, bands supportable in the first base station may be at least partially different from bands supportable in the second base station.

In various embodiments, transmitting the information for indicating the band combination configured with the second bands may include, transmitting a message for indicating that a change of user equipment (UE) capability information is required to the second base station, in a state of the electronic device being coupled to the network through the second base station after the performing the cell re-selection, and transmitting the information indicating the band combination configured with the second bands after transmitting the message.

A method for operating a base station of various embodiments described above may include transmitting information indicating a plurality of bands supportable in a network to an external electronic device, and receiving information about a band combination configured with bands which are available in the external electronic device for carrier aggregation (CA) and are identified by the external electronic device, among the plurality of bands, from the external electronic device.

In various embodiments, receiving the information may include transmitting a message of requesting to transmit a band combination available for CA to the external electronic device, and receiving the information as a response to the transmitted message. For example, the message transmitted from the base station may correspond to a user equipment (UE) capability enquiry message, and the information received from the external electronic device may be included in a UE capability information message.

In various embodiments, the information indicating the plurality of bands may be included in a system information message transmitted from the base station. For example, the system information message may include information related with inter-frequency cell re-selection.

In various embodiments, the method may further include providing the information received from the external electronic device to a mobility management entity (MME), to store the information received from the external electronic device.

Methods of embodiments mentioned in the claims or the disclosure may be implemented in the form of hardware, software, or any combination of the hardware and the software.

In response to being implemented by the software, a computer-readable storage media storing one or more programs (e.g., software modules) may be provided. The one or more programs stored in the computer-readable storage media are configured to be executable by one or more processors within an electronic device. The one or more programs include instructions for enabling the electronic device to execute the methods of the embodiments stated in the claims or specification of the disclosure.

These programs (e.g., software modules and/or software) may be stored, for example, and without limitation, in a random access memory (RAM), a non-volatile memory including a flash memory, a read only memory (ROM), an electrically erasable programmable ROM (EEPROM), a magnetic disc storage device, a compact disc—ROM (CD-ROM), digital versatile discs (DVDs), an optical storage device of another form, and/or a magnetic cassette, or the like. The program may be stored in a memory that is constructed in combination of some or all of them. Each constructed memory may be included in plural as well.

Also, the program may be stored in an attachable storage device that may access through a communication network such as, for example, and without limitation, the Internet, an intranet, a local area network (LAN), a wireless LAN (WLAN), a storage area network (SAN), or the like, and/or a communication network configured in combination of them. This storage device may connect to a device of performing an embodiment of the disclosure through an external port. Also, a separate storage device on the communication network may connect to the device of performing the embodiment of the disclosure as well.

In the aforementioned example embodiments of the disclosure, elements included in the disclosure have been expressed in the singular or plural according to a proposed example embodiment. However, the expression of the singular or plural is selected suitable to a given situation for the sake of description convenience, and the disclosure is not limited to singular or plural elements. Even an element expressed in the plural may be constructed in the singular, or even an element expressed in the singular may be constructed in the plural.

While a detailed description of the disclosure has been made for various example embodiments, it will be understood that various modifications are available without departing from the scope of the disclosure. Therefore, the scope of the disclosure should not be defined limited to the illustrated embodiment.

An electronic device performing cellular communication using carrier aggregation (CA) of various illustrated non-limiting example embodiments and a method thereof may enhance resource efficiency, by changing a band combination, based at least on bands supportable in a network.

An effect obtainable from the present disclosure is not limited to the above-mentioned effects, and other effects not mentioned will be able to be apparently understood from the following statement by a person having ordinary skill in the art to which the present disclosure pertains.

What is claimed is:

1. An electronic device comprising:
at least one memory configured to store instructions;
communication circuitry; and
at least one processor operatively coupled to the at least one memory and the communication circuitry, wherein the at least one processor is configured, based on executing the instructions, to control the electronic device to:
receive information indicating a plurality of bands supportable in a network, from a base station;
identify bands available in the electronic device for carrier aggregation (CA), from among the plurality of bands supportable in the network received from the base station;
transmit information regarding a band combination configured with the identified bands, to the base station;
perform cell re-selection after transmitting the information regarding the band combination configured with the identified bands; receive another information indicating a plurality of bands supportable in the network after the performing the cell re-selection;
identify whether all of the plurality of bands indicated by the another information received after the performing of the cell re-selection correspond to all of the plurality of bands indicated by the information received before the performing of the cell re-selection; and transmit a message indicating maintaining of the information regarding the band combination configured with the identified bands based on identifying that all of the plurality of bands indicated by the another information received after the performing of the cell re-selection correspond to all of the plurality of bands indicated by the information received before the performing of the cell re-selection.

2. The electronic device of claim 1, wherein the at least one processor is configured, based on executing the instructions, to control the electronic device to:

receive a message requesting transmission of a band combination available for CA, from the base station; and transmit information regarding the band combination configured with the identified bands, to the base station, based on receiving the message.

3. The electronic device of claim 2, wherein the message received from the base station corresponds to a user equipment (UE) capability enquiry message, and wherein the information regarding the band combination configured with the identified bands is included in a UE capability information message.

4. The electronic device of claim 1, wherein the information indicating the plurality of bands is included in a system information message transmitted from the base station.

5. The electronic device of claim 4, wherein the system information message comprises information related with inter-frequency cell re-selection.

6. The electronic device of claim 1, wherein the information regarding the band combination configured with the identified bands transmitted from the electronic device is stored in a mobility management entity (MME) comprising a memory through the base station.

7. The electronic device of claim 1, wherein the at least one processor is further configured, based on executing the instructions, to control the electronic device to:

transmit a message indicating changing of the information regarding the band combination configured with the identified bands transmitted before the performing of the cell re-selection based on identifying that at least some of the plurality of bands indicated by the another information received after the performing of the cell re-selection are different from at least some of the plurality of bands indicated by the information received before the performing of the cell re-selection.

8. The electronic device of claim 7, wherein the at least one processor is further configured, based on executing the instructions, to control the electronic device to:

identify other bands which are available in the electronic device for carrier aggregation (CA), from among the plurality of bands indicated by the another information received after the performing of the cell re-selection, based on transmitting the message indicating changing of the information regarding the band combination configured with the identified bands transmitted before the performing of the cell re-selection; and transmit information regarding another band combination configured with the identified other bands.

9. The electronic device of claim 1, wherein the at least one processor is further configured, based on executing the instructions, to control the electronic device to:

receive information indicating a plurality of frequencies of a radio access technology (RAT) supportable in the network from another base station supporting another RAT different from the RAT supported by the base station;

identify bands which are available in the electronic device for CA from among the plurality of frequencies; and obtain a band combination configured with the bands identified from among the plurality of frequencies.

10. An electronic device comprising:

wireless communication circuitry; a processor operatively coupled to the wireless communication circuitry; and a memory operatively coupled to the processor, wherein the memory is configured to store instructions that, based on execution, configure the processor to control the electronic device to:

receive, from a base station, a first message related with a user equipment (UE) capability enquiry, the first message comprising information indicating a number of carrier aggregation (CA) combinations related with a network associated with the base station, using the wireless communication circuitry;

identify UE capability information, based at least in part on the number of CA combinations related with the network and the number of CA combinations supportable in the electronic device;

transmit a second message comprising the identified UE capability information, including a band combination for CA, to the network, using the wireless communication circuitry;

perform cell re-selection after transmitting the second message;

receive another information indicating a plurality of bands supportable in the network after the performing the cell re-selection;

identify whether all of the plurality of bands indicated by the another information received after the performing of the cell re-selection correspond to all of the plurality of bands indicated by the information received before the performing of the cell re-selection, and transmit a message indicating maintaining of the information regarding the band combination configured with the identified bands based on identifying that all of the plurality of bands indicated by the another information received after the performing of the cell re-selection correspond to all of the plurality of bands indicated by the information received before the performing of the cell re-selection.

11. The electronic device of claim 10, wherein the instructions, based on execution, configure the processor to control the electronic device to receive a system information block (SIB) from the base station, and wherein the SIB comprises information related with the number of CA combinations associated with the network.

12. The electronic device of claim 10, wherein the number of CA combinations associated with the network comprises at least one of the number of CA combinations supported by a cell of the base station or a number of CA combinations supported by a neighboring cell of the base station.

13. The electronic device of claim 10, wherein the instructions, based on execution, configure the processor to control the electronic device to:

receive changed network information different from the network information, using the wireless communication circuitry;

re-identify UE capability information, based at least in part on the number of CA combinations associated with the changed network and the number of CA combinations supportable in the electronic device; and transmit a second message comprising the re-identified UE capability information to the network using the wireless communication circuitry.

14. The electronic device of claim 10, wherein the wireless communication circuitry is configured to be connectable to a 4-Generation (4G) network and a 5-Generation (5G) network.

15. The electronic device of claim 10, wherein the UE capability information included in the second message comprises data indicating the number of CA combinations to be used in the electronic device identified based at least in part on the number of CA combinations related with the network and the number of CA combinations supported by the electronic device.

16. An electronic device comprising:
at least one memory configured to store instructions;
communication circuitry; and
at least one processor operatively coupled to the at least one memory and the communication circuitry,
wherein the at least one processor is configured, based on executing the instructions, to control the electronic device to:
transmit information indicating a band combination configured with first bands which are available in the electronic device for carrier aggregation (CA) to a first base station, in a state of the electronic device being coupled to a network through the first base station;
perform cell re-selection with a second base station different from the first base station after transmitting the information;
transmit information indicating a band combination configured with second bands which are available in the electronic device for CA and are at least partially different from the first bands, to the second base station, in a state of the electronic device being coupled to the network through the second base station after performing the cell re-selection;
identify whether all of a plurality of bands indicated by another information received from the second base station after the performing of the cell re-selection correspond to a CA band combination indicated by the information received before the performing of the cell re-selection, and
transmit to the second base station a message indicating maintaining of the information regarding the band combination from the first base station prior to the cell re-selection based on identifying that all of the plurality of bands indicated by the another information received from the second base station after the performing of the cell re-selection correspond to the CA band combination of the electronic device prior to the cell re-selection.

17. The electronic device of claim 16, wherein a size of the information indicating the band combination configured with the first bands is different from a size of the information indicating the band combination configured with the second bands.

18. The electronic device of claim 16, wherein bands supportable in the first base station are at least partially different from bands supportable in the second base station.

19. The electronic device of claim 16, wherein the at least one processor is configured, based on executing the instructions, to control the electronic device to:
transmit a message to the second base station indicating that a change of user equipment (UE) capability information is required, in a state of the electronic device being coupled to the network through the second base station after the performing the cell re-selection; and
transmit the information indicating the band combination configured with the second bands after transmitting the message.

* * * * *